United States Patent
Heikkilä et al.

(10) Patent No.: US 8,287,652 B2
(45) Date of Patent: Oct. 16, 2012

(54) SEPARATION PROCESS

(75) Inventors: Heikki Heikkilä, Espoo (FI); Hannu Koivikko, Kantvik (FI); Elina Sjöman, Vaulammi (FI); Mika Mänttäri, Lappeenranta (FI)

(73) Assignee: Danisco A/S, Copenhagen K (DK)

( * ) Notice: Subject to any disclaimer, the term of this patent is extended or adjusted under 35 U.S.C. 154(b) by 402 days.

(21) Appl. No.: 12/091,908

(22) PCT Filed: Oct. 27, 2006

(86) PCT No.: PCT/FI2006/050464
§ 371 (c)(1), (2), (4) Date: Jul. 30, 2008

(87) PCT Pub. No.: WO2007/048879
PCT Pub. Date: May 3, 2007

(65) Prior Publication Data
US 2009/0173339 A1    Jul. 9, 2009

(30) Foreign Application Priority Data
Oct. 28, 2005    (FI) ..................................... 20055581

(51) Int. Cl.
*C13B 20/12* (2011.01)
*B01D 61/00* (2006.01)

(52) U.S. Cl. ......................................... 127/55; 210/650
(58) Field of Classification Search ........................ None
See application file for complete search history.

(56) References Cited

U.S. PATENT DOCUMENTS

| | | |
|---|---|---|
| 4,511,654 A | 4/1985 | Rohrbach et al. |
| 4,631,129 A | 12/1986 | Heikkila |
| 5,637,225 A | 6/1997 | Heikkila et al. |
| 5,730,877 A | 3/1998 | Heikkila et al. |
| 5,869,297 A | 2/1999 | Binder et al. |
| 5,965,028 A | 10/1999 | Verhoff et al. |
| 6,126,754 A | 10/2000 | Duflot |
| 6,406,546 B1 | 6/2002 | Donovan et al. |
| 2002/0079268 A1 | 6/2002 | Caboche et al. |
| 2002/0153317 A1* | 10/2002 | Heikkila et al. ............. 210/650 |
| 2003/0092136 A1 | 5/2003 | Delobeau et al. |
| 2005/0203291 A1 | 9/2005 | Svenson et al. |

FOREIGN PATENT DOCUMENTS

| | | |
|---|---|---|
| CN | 1 594 339 | 3/2005 |
| WO | WO 99/28490 | 6/1999 |
| WO | WO 02/053781 A1 | 7/2002 |
| WO | WO 02/053783 A1 | 7/2002 |
| WO | 2004/003236 A1 | 1/2004 |

OTHER PUBLICATIONS

Sjoman, E. et al., "Nanofiltration of Monosaccharide Containing Solution to Recover Xylose" *Desalination* (2006 ) pp. 348-349, vol. 199.
Supplemental European Search Report dated Dec. 21, 2009.
M. Saska et al., "Direct Production of White Cane Sugar with Clarification and Decolorization Membranes", Sugar Journal, Nov. 1995, pp. 19 to 21 and Dec. 1995, pp. 29 to 31.
N. Aydogan et al. (Department of Chemical Engineering, Middle East Technical University, Ankara, Turkey) "Effect of operating parameters on the separation of sugars by nanofiltration", Separation Science and Technology (1998), 33 (12), pp. 1767-1785.
M. L. Bruening et al. (Department of Chemistry, Michigan State University, East Lansing, MI. USA) "Nanofiltration with multiplayer polyelectrolyte membranes", PMSE Preprints (2003), 89, 169.
G. Yang et al. (Membrane Science and Technology Research Center, Nanjing University of Chemical Technology, Nanjing, China) "Concentration of xylose solution through nanfiltration", Mo Kexue Yu Jishu (2000), 21-26 (Journal written in Chinese).
G.S. Murthy et al. (Membrane Separations Group, Chemical Engineering Division, Indian Institute of Chemical Technology, Hyderabad, India) "Concentration of xylose reaction liquor by nanofiltration for the production of xylitol suagr alcohol", Seperation and Purification Technology 44 (2005) 221-228.
Goulas A. K. et al. Purification of oligosaccharides by nanofiltration. Joural of Membrane Science. 2002, vol. 209 p. 321-335 pp. 330-331 Fig. 5.

* cited by examiner

*Primary Examiner* — Emily Le
*Assistant Examiner* — Sarah A Slifka
(74) *Attorney, Agent, or Firm* — Scully, Scott, Murphy & Presser, P.C.

(57) ABSTRACT

The invention relates to an improved nanofiltration process of recovering xylose from a solution of a plant-based biomass hydrolysate. The process of the present invention is based on the regulation of the xylose flux in the nanofiltration process.

40 Claims, 14 Drawing Sheets

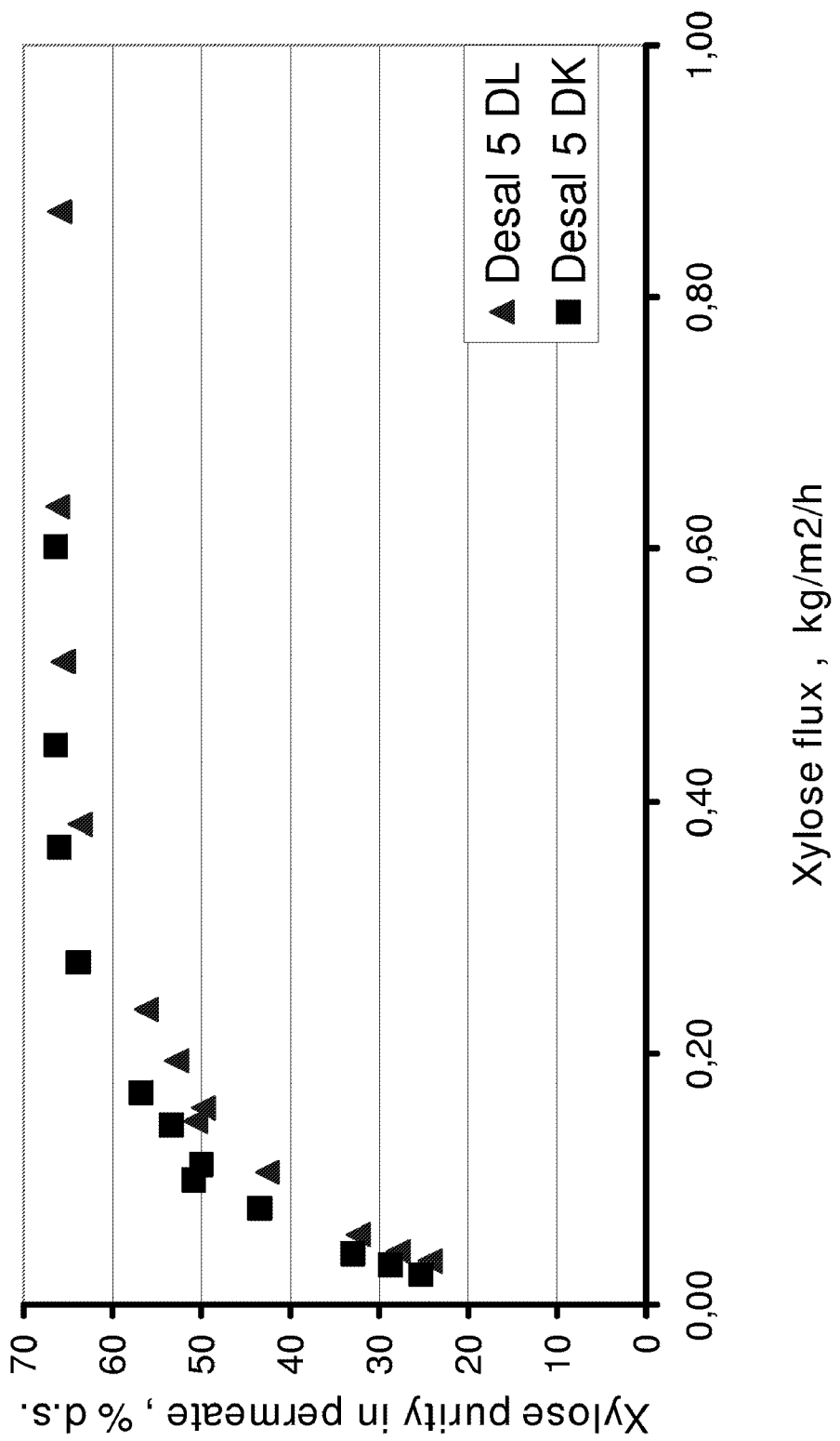

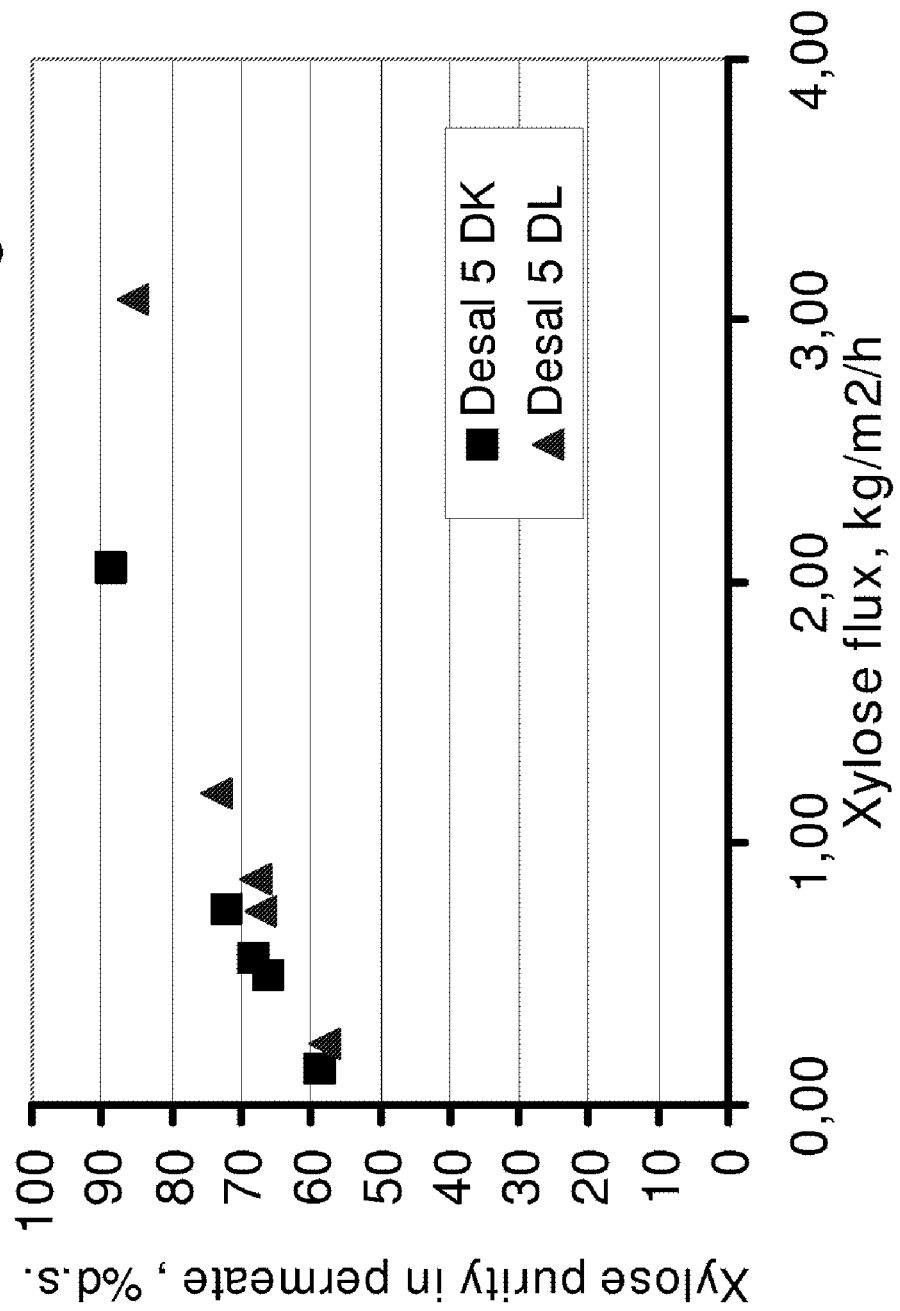

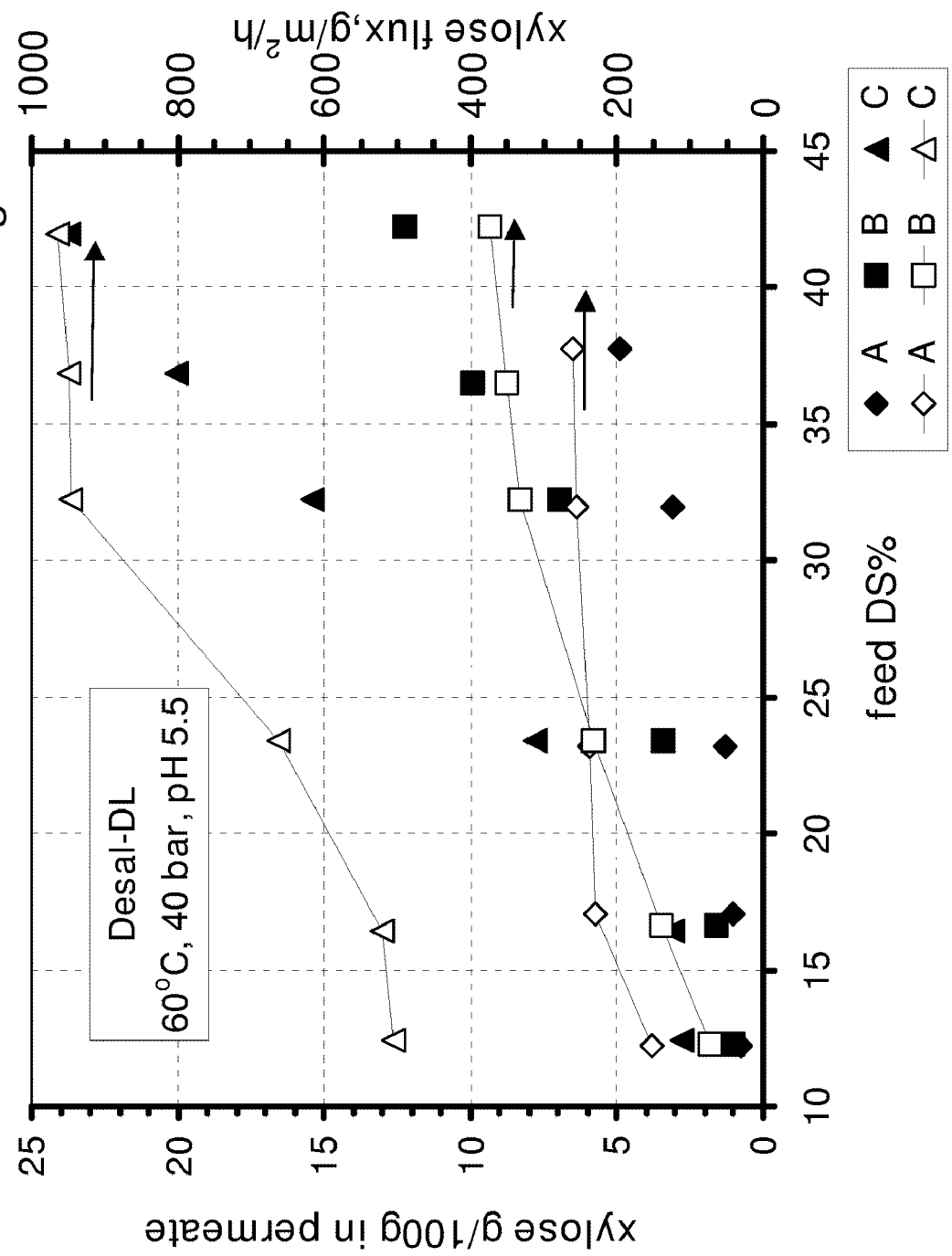

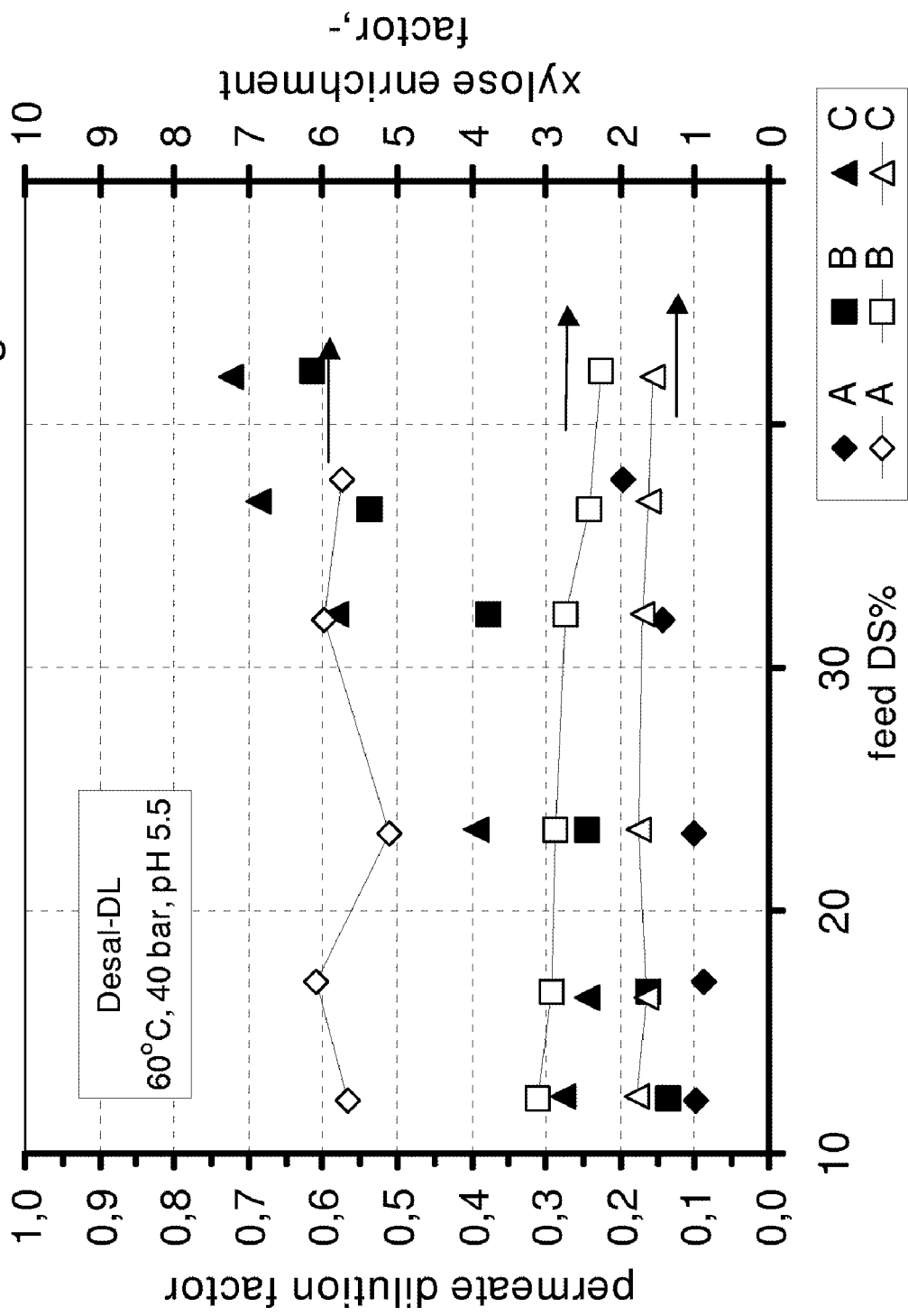

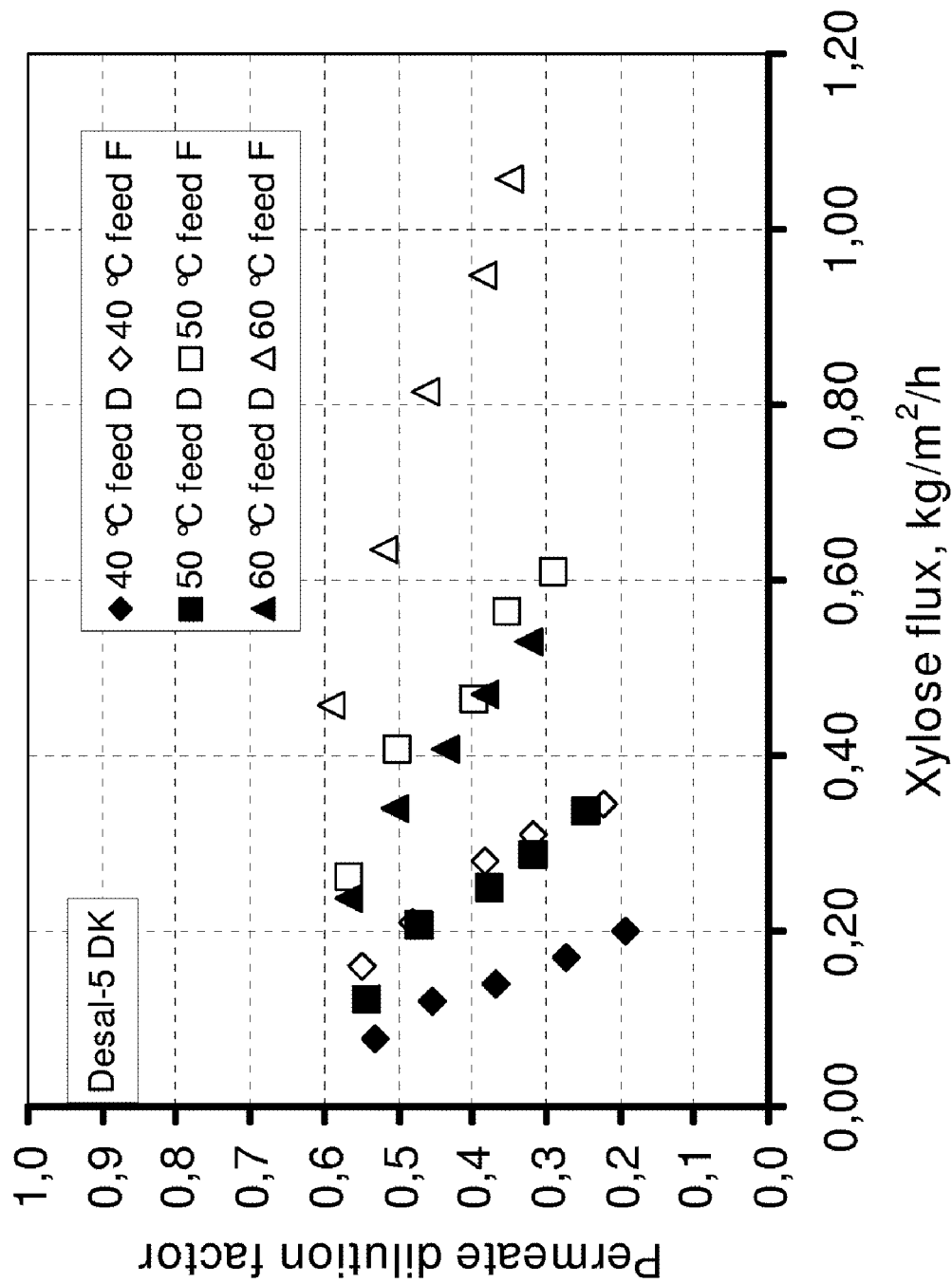

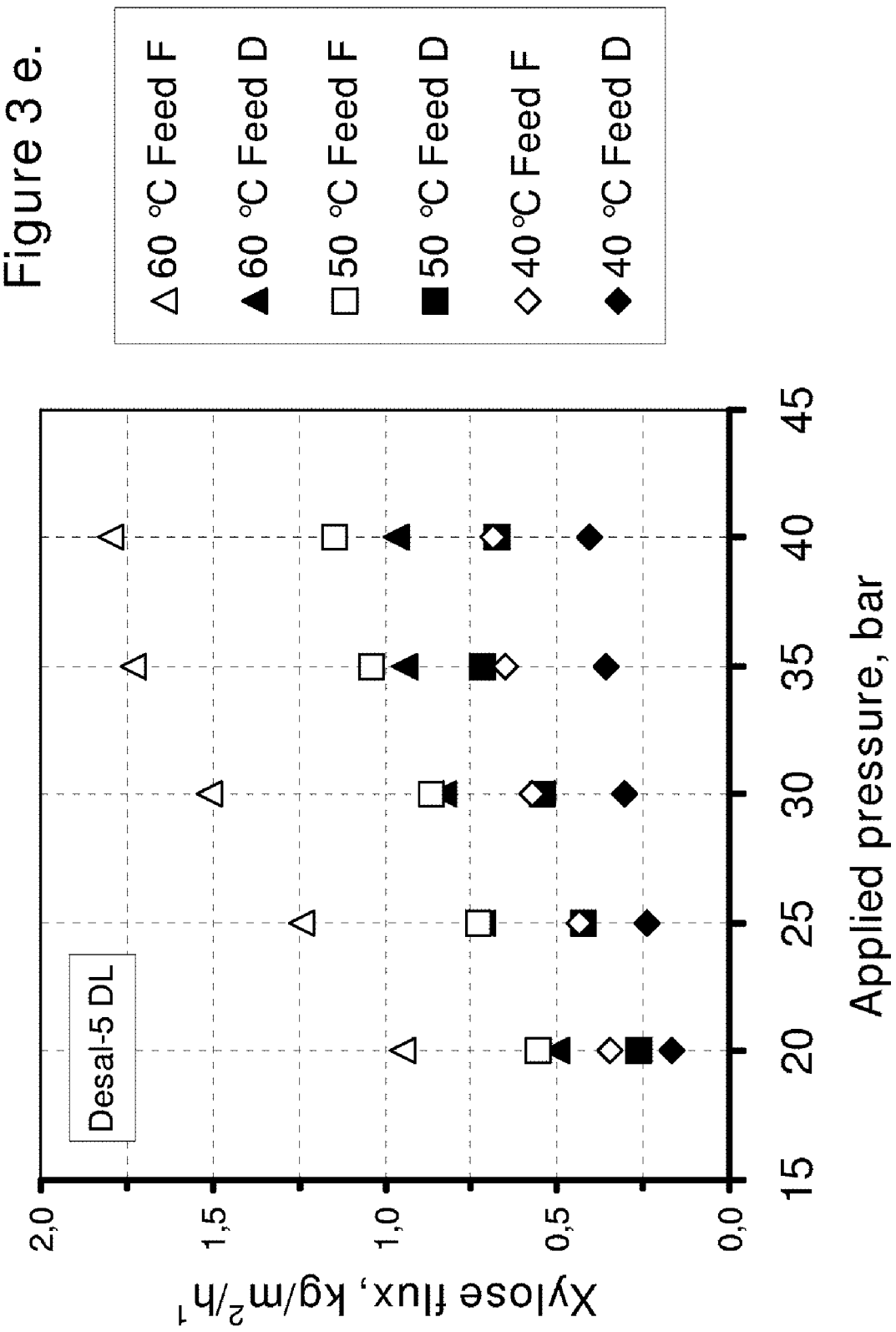

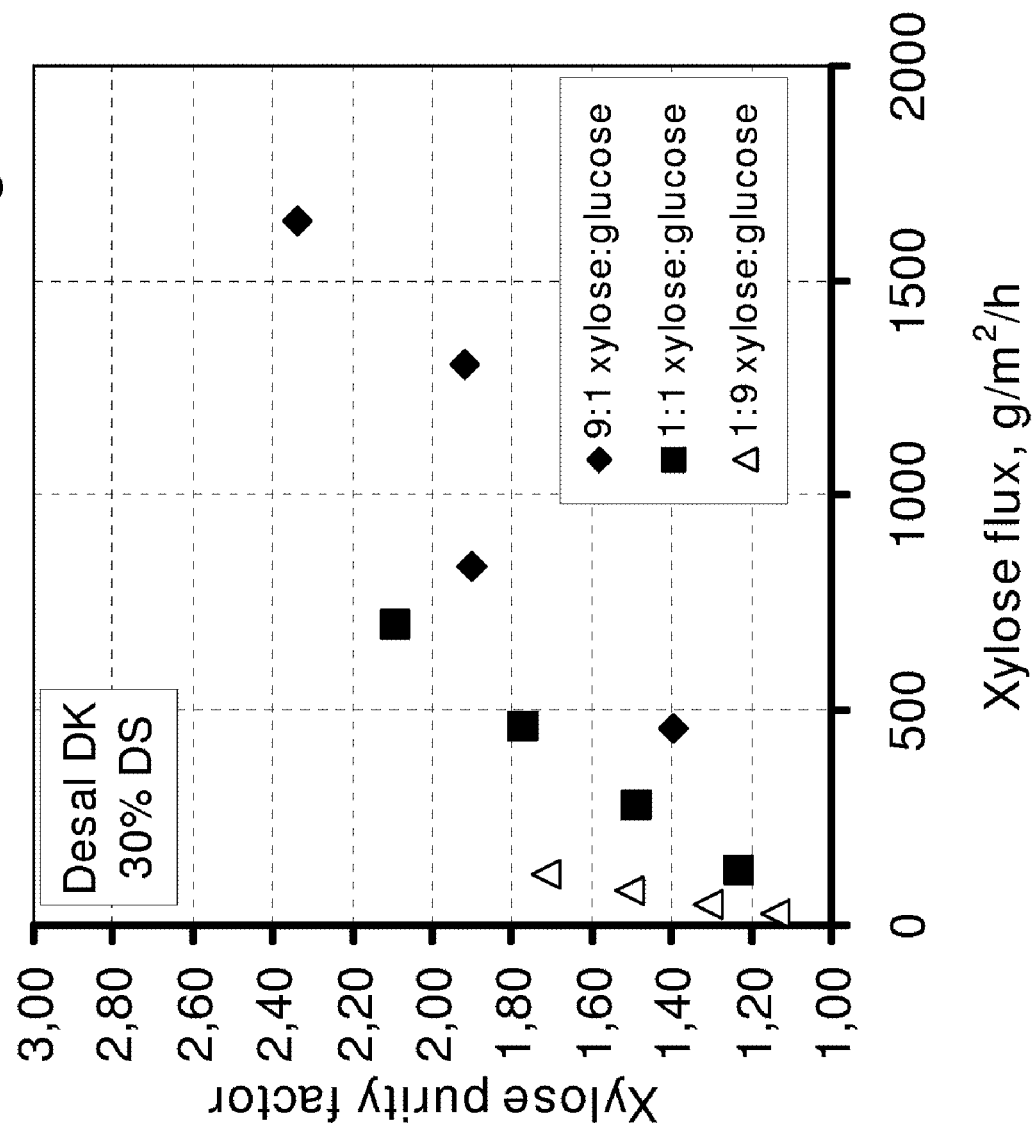

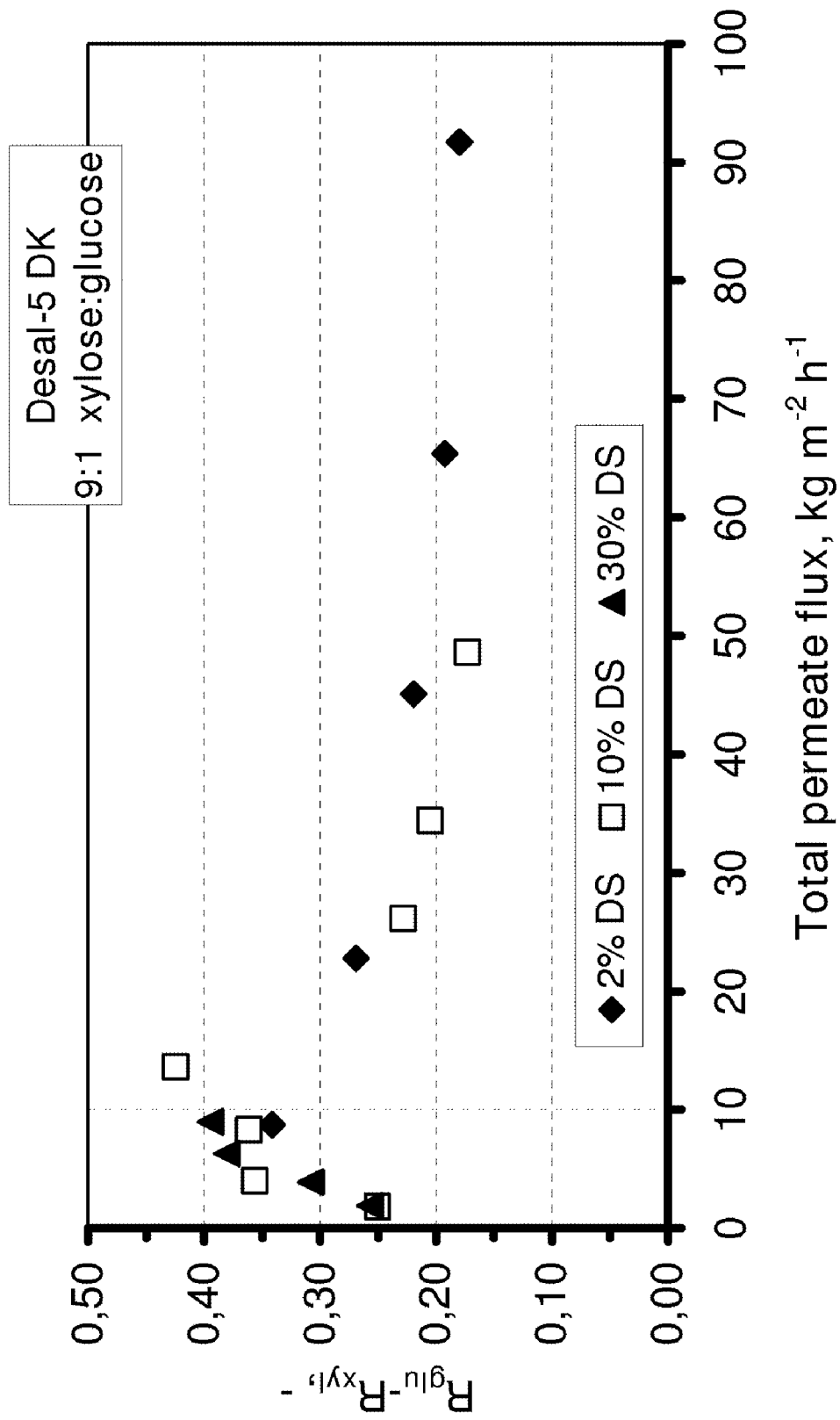

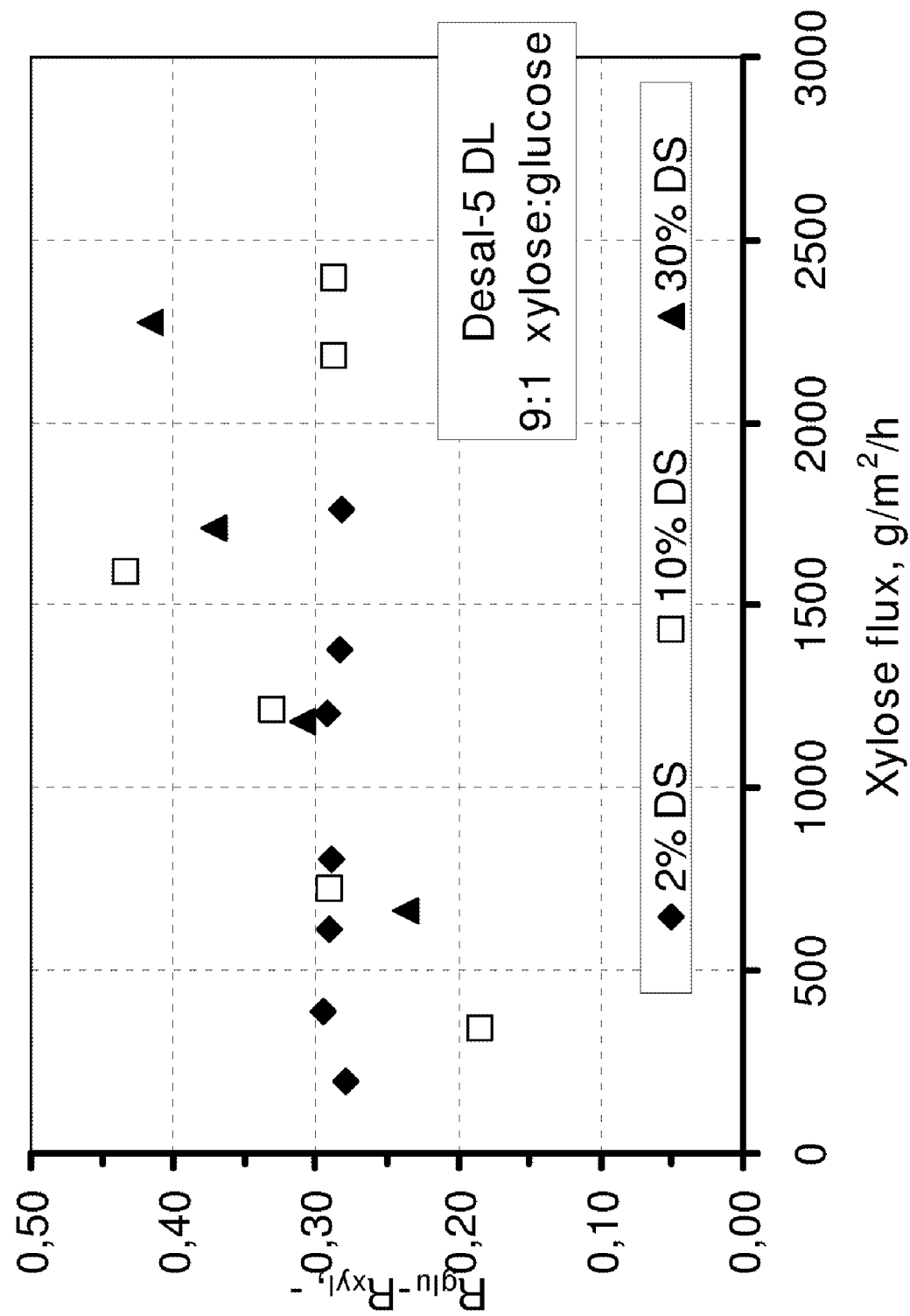

SEPARATION PROCESS

FIELD OF THE INVENTION

The present invention relates to an improved process of recovering xylose by nanofiltration from a solution of a plant-based biomass hydrolysate by regulating the xylose flux in the nanofiltration process.

BACKGROUND OF THE INVENTION

Xylose is a valuable raw material in the sweets, aroma and flavoring industries and particularly as a starting material in the production of xylitol. Xylose is formed in the hydrolysis of xylan-containing hemicellulose, for example in the direct acid hydrolysis of biomass, in enzymatic or acid hydrolysis of a prehydrolysate obtained from biomass by prehydrolysis (with steam or acetic acid, for instance), and in sulphite pulping processes. Vegetable materials rich in xylan include the wood material from various wood species, particularly hardwood, such as birch, aspen and beech, various parts of grain (such as straw and husks, particularly corn and barley husks and corn cobs and corn fibers), bagasse, coconut shells, cottonseed skins etc.

Xylose can be recovered by crystallization e.g. from xylose-containing solutions of various origin and purity, such as spent sulphite pulping liquors. In addition to xylose, the spent sulphite pulping liquors contain, as typical components, lignosulphonates, sulphite cooking chemicals, xylonic acid, oligomeric sugars, dimeric sugars and monosaccharides (other than the desired xylose), and carboxylic acids, such as acetic acid, and uronic acids.

Before crystallization, it is as a rule necessary to purify the xylose-containing solution obtained as a result of the hydrolysis of cellulosic material to a required degree of purity by various methods, such as filtration to remove mechanical impurities, ultrafiltration, ion-exchange, decolouring, ion exclusion or chromatography or combinations thereof.

Xylose is produced in large amounts in pulp industry, for example in the sulphite cooking of hardwood material. Chromatographic methods for the separation of xylose from such cooking liquors have been disclosed for example in U.S. Pat. No. 4,631,129 (Suomen Sokeri Oy), U.S. Pat. No. 5,637,225 (Xyrofin Oy) and U.S. Pat. No. 5,730,877 (Xyrofin Oy).

It is also known to use membrane techniques, such as ultrafiltration to purify spent sulphite pulping liquors (e.g. Papermaking Science and Technology, Book 3: Forest Products Chemistry, p. 86, ed. Johan Gullichsen, Hannu Paulapuro and Per Stenius, Helsinki University of Technology, published in cooperation with the Finnish Paper Engineer's Association and TAPPI, Gummerus, Jyväskylä, Finland, 2000). High-molar-mass lignosulphonates can thus be separated by ultrafiltration from the low-molar-mass components, such as xylose.

Nanofiltration is a relatively new pressure-driven membrane filtration process, falling between reverse osmosis and ultrafiltration. Nanofiltration typically retains large and organic molecules with a molar mass greater than 300 g/mol. The most important nanofiltration membranes are composite membranes made by interfacial polymerisation. Polyether sulfone membranes, sulfonated polyether sulfone membranes, polyester membranes, polysulfone membranes, aromatic polyamide membranes, polyvinyl alcohol membranes and polypiperazine membranes are examples of widely used nanofiltration membranes. Inorganic and ceramic membranes can also be used for nanofiltration.

Nanofiltration membranes have been defined by their ability to reject only ions which have a negative charge over one, such as sulphate or phosphate, while passing single-charged ions. The rejection of uncharged, dissolved materials and also of positively charged ions in the solution relate mostly to the size and shape of the molecule in question. The nominal cut-off value of the molecular size relating to nanofiltration is defined to be in the range of 100-1000 g/mol.

Nanofiltration has been used for separating monosaccharides, such as glucose, from disaccharides and higher saccharides. The starting mixture including monosaccharides, disaccharides and higher saccharides may be a starch hydrolysate, for example.

U.S. Pat. No. 5,869,297, Archer Daniels Midland Co. (published Feb. 9, 1999) discloses a nanofiltration process for making dextrose. This process comprises nanofiltering a dextrose composition including as impurities higher saccharides, such as disaccharides and trisaccharides. A dextrose composition having a solids content of at least 99% dextrose is obtained. Crosslinked aromatic polyamide membranes have been used as nanofiltration membranes.

WO 99/28490, Novo Nordisk AS (published Jun. 10, 1999) (=U.S. Pat. No. 6,329,182) discloses a method for enzymatic reaction of saccharides and for nanofiltration of the enzymatically treated saccharide solution including monosaccharides, disaccharides, trisaccharides and higher saccharides. Monosaccharides are obtained in the nanofiltration permeate, while an oligosaccharide syrup containing disaccharides and higher saccharides is obtained in the retentate. The retentate including the disaccharides and higher saccharides is recovered. A thin film composite polysulfone membrane having a cut-off size less than 100 g/mol has been used as the nanofiltration membrane, for example.

U.S. Pat. No. 4,511,654, UOP Inc. (published Apr. 16, 1985) relates to a process for the production of a high glucose or maltose syrup by treating a glucose/maltose-containing feedstock with an enzyme selected from amyloglucosidase and β-amylase to form a partially hydrolyzed reaction mixture, passing the resultant partially hydrolyzed reaction mixture through an ultrafiltration membrane to form a retentate and a permeate, recycling the retentate to the enzyme treatment stage, and recovering the permeate including the high glucose or maltose syrup.

U.S. Pat. No. 6,126,754, Roquette Freres (published Oct. 3, 2000) relates to a process for the manufacture of a starch hydrolysate with a high dextrose content. In this process, a starch milk is subjected to enzymatic treatment to obtain a raw saccharified hydrolysate. The hydrolysate thus obtained is then subjected to nanofiltering to collect as the nanofiltration permeate the desired starch hydrolysate with a high dextrose content.

U.S. Pat. No. 6,406,546 B1, Tate & Lyle Industries (published Jun. 18, 2002) discloses a process of obtaining sucrose from a sucrose-containing syrup by nanofiltering the syrup through a nanofiltration membrane and recovering the nanofiltration retentate enriched in sucrose. It is recited that invert sugars are passed through the nanofiltration membrane into the nanofiltration permeate. FIG. 3 of the publication discloses a three-stage nanofiltration process for obtaining a sucrose-containing nanofiltration retentate. US 2003/0092136A1, D. Delobeau (published May 15, 2003) discloses a process for the manufacture of a starch hydrolysate having a high content of dextrose by a two-stage nanofiltration process. A nanofiltration permeate enriched in dextrose (glucose) is recovered.

US 2002/0079268 A1, J-J Caboche (published Jun. 27, 2002) discloses a process for preparing a fermentation medium for producing high-purity metabolites (such as organic acids, for example optically pure L-lactic acid) from a renewable material (such as wheat solubles or corn steep liquor) by nanofiltration and/or electrodialysis. The purpose of the nanofiltration and/or electrodialysis is to eliminate low molecular weight impurities from the raw material without degrading its concentration of carbon sources.

U.S. Pat. No. 5,965,028, Reilly Industries (published Oct. 12, 1999) discloses a process for the separation of citric acid from less desirable components having a molecular weight similar to that of citric acid (such as glucose and/or fructose) by nanofiltration. A nanofiltration permeate enriched in citric acid is recovered. The feed used for the nanofiltration is typically a clarified citric acid fermentation broth.

M. Saska et al. discuss the decolorization of white cane sugar by nanofiltration in "Direct Production of White Cane Sugar with Clarification and Decolorization Membranes", Sugar Journal, November 1995, pp. 19 to 21 and December 1995, pp. 29 to 31. Decolorization of ultrafiltered clarified juice was carried out with G-10 thin-film nanofiltration membranes having a molecular weight cut-off of 2500 daltons.

N. Aydogan et al. (Department of Chemical Engineering, Middle East Technical University, Ankara, Turkey) discuss the separation and recovery of sugars by nanofiltration in "Effect of operating parameters on the separation of sugars by nanofiltration", Separation Science and Technology (1998), 33(12), pp. 1767-1785. For example, it was found that with an increase of the feed flow rate, permeate flux increased. It was also found that there is a linear relationship between the pressure and the permeate flux up to 30 bars. To investigate the effect of the concentration, 1 to 10 weight-% solutions of sucrose and glucose were utilized, whereby it was found that with an increase in the concentration, permeate flux decreased.

M. L. Bruening et al. (Department of Chemistry, Michigan State University, East Lansing, Mich. USA) have investigated the behaviour of multilayer polyelectrolyte membranes in "Nanofiltration with multilayer polyelectrolyte membranes", PMSE Preprints (2003), 89, 169. It is recited that minimum thickness of the polyelectrolyte films as nanofiltration membranes affords high flux in the nanofiltration. Furthermore, it was found that the charge was the primary factor in the nanofiltration of small neutral molecules (such as methanol and glycerol). It is also recited that the selectivity of 150 between larger neutral molecules (i.e. glucose and sucrose) was achieved.

Chemistry and Industry of Forest Products, vol. 22, No. 1, 2002, pp. 77-81 discloses a review discussing the application of membrane separation in desalinization, concentration and purification of xylan extracts, separation of xylo-oligosaccharides from xylan hydrolysates, and the classification and purification of oligosaccharides. Examples of processing renewable plant resources using membrane separation are given. These include, for example, continuous ethanol fermentation coupled with membrane separation and the concentration of plant xylose solution by nanofiltration.

G. Yang et al. (Membrane Science and Technology Research Center, Nanjing University of Chemical Technology, Nanjing, China) discuss the nanofiltration of xylose in "Concentration of xylose solution through nanofiltration", Mo Kexue Yu Jishu (2000), 20(5), 21-26 (Journal written in Chinese). In this study, two types of spirally wound nanofiltration modules differing in the cut-off size were used to study the nanofiltration process of crude industrial xylose. It is recited that the xylose solution was concentrated from 4% to 20% by a nanofiltration equipment comprising a 4-stage serial connection configuration.

G. S. Murthy et al. (Membrane Separations Group, Chemical Engineering Division, Indian Institute of Chemical Technology, Hyderabad, India) discuss the concentration of xylose by nanofiltration in "Concentration of xylose reaction liquor by nanofiltration for the production of xylitol sugar alcohol", Separation and Purification Technology 44 (2005) 221-228. Pilot scale nanofiltration experiments were carried out using a polyamide (PA) spiral membrane module having 300 molecular weight cut-off and 1 $m^2$ effective area. It is recited that at a feed pressure of 20 bar, xylose was concentrated from 2 to 10% at a reasonably high average flux of 241 $l/(m^2\ h)$ and rejection of >99% which indicated negligible losses of the sugar in the permeate. The feed for the nanofiltration was an acid hydrolysate of rice husk. In accordance with this reference, xylose is concentrated in the nanofiltration retentate. The purity of concentrated xylose product in relation to the other components of the rice husk hydrolysate is not discussed.

Publication CN 1 594 339 A (published 16 Mar. 2005) discloses a method for recovering xylose from waste hydrolyzed fermentation liquor of biomass. The method comprises nanofiltering the liquor at a temperature of 5-50° C., at a pressure of 0.1-3.0 MPa and with a flow rate of 4.0-15.0 l/min through a nanofiltration membrane to obtain an effluent and then filtering at a temperature of 5-50° C., at a pressure of 0.5-6.0 MPa and with a flow rate of 6.0-20.0 l/min through a reverse osmosis membrane to obtain recovered concentrated xylose.

WO 02/053783 and WO 02/053781, Danisco Sweeteners Oy (published 11 Jul. 2002) disclose a process of producing a xylose solution from a biomass hydrolysate by subjecting the biomass hydrolysate to nanofiltration and recovering as the nanofiltration permeate a solution enriched in xylose. The feed used for the nanofiltration may be for example a spent sulphite pulping liquor containing a mixture of other closely-related monosaccharides, such as glucose, galactose, rhamnose, arabinose and mannose, in addition to the desired xylose. It was found that the nanofiltration effectively concentrated pentose sugars, such as xylose in the nanofiltration permeate, while hexose sugars retained more in the nanofiltration retentate. However, the permeate obtained from the nanofiltration had a relatively low dry substance content (1 to 2%) and consequently a low xylose content. Furthermore, the xylose yields achieved were low (less than 20%). The xylose flux achieved was less than 0.2 kg xylose $m^{-2}\ h^{-1}$. Hereby the performance of the process was not sufficient for industrial operation.

When the aim 1n industrial nanofiltration processes is to achieve a high xylose yield, it has been as a rule difficult to achieve a high xylose flux (high capacity) at the end of the nanofiltration when approaching the yield value of over 80% and especially over 90%. This concerns both batch processes as well as continuous multistep processes.

BRIEF DESCRIPTION OF THE INVENTION

It is an object of the present invention to provide an improved method for recovering xylose by nanofiltration from solutions of plant-based biomass hydrolysate so as to alleviate the above disadvantages relating to the known methods, especially the problems relating to insufficient performance of the known methods, including excess dilution and low xylose yields, which make these processes uneconomical in industrial scale. The objects of the invention are achieved by a method, which is characterized by what is stated in the independent claims. The preferred embodiments of the invention are disclosed in the dependent claims.

The invention is based on improving the performance of the nanofiltration of xylose by regulating the xylose flux in the nanofiltration process. Surprisingly, it was found that by adjusting the dry substance content of the nanofiltration feed to a relatively high value, preferably to the range of 10 to 40% by weight and simultaneously adjusting the xylose content of the feed typically to the range of 15 to 65% on dry substance, a high xylose flux in the nanofiltration was achieved leading to the enrichment of xylose to permeate with good yield and minor dilution of the dry solids content. Further improvements in the xylose flux were obtained by regulating other process parameters, such as nanofiltration pressure and temperature. Simultaneously, a favorable enrichment factor of xylose in the nanofiltration permeate together with a favorable dilution degree of the nanofiltration permeate were obtained, which resulted in good performance of the nanofiltration operation.

BRIEF DESCRIPTION OF THE DRAWINGS

In the following the invention will be described in greater detail by means of preferred embodiments with reference to the attached drawings, in which FIG. 1a shows the xylose purity of the nanofiltration permeate as a function of the xylose flux in the nanofiltration of Example 1a.

FIG. 1b shows the xylose purity of the nanofiltration permeate as a function of the xylose flux in the nanofiltration of Example 1b.

FIG. 2a shows the amount of xylose in the nanofiltration permeate and the xylose flux as a function of the dry substance content of the feed in the nanofiltration of Example 2.

FIG. 2b shows the permeate dilution factor and the xylose enrichment factor as a function of the dry substance content of the feed in the nanofiltration of Example 2.

DETAILED DESCRIPTION OF THE INVENTION

Figure 3B:
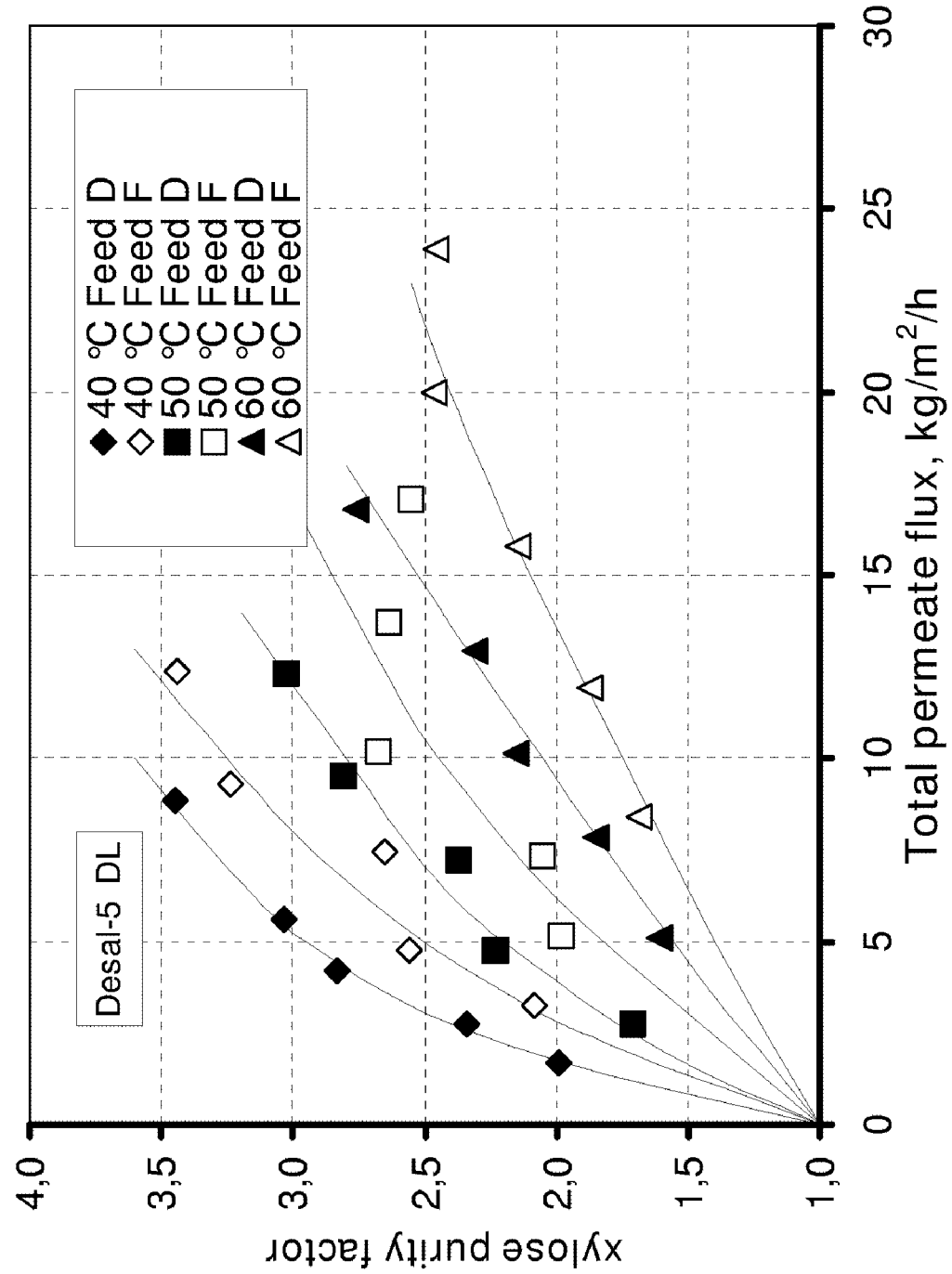
FIG. 3b shows the xylose purity of the nanofiltration permeate as a function of the total permeate flux using Desal-5 DL nanofiltration membrane in the nanofiltration of Example 3.
Figure 3:
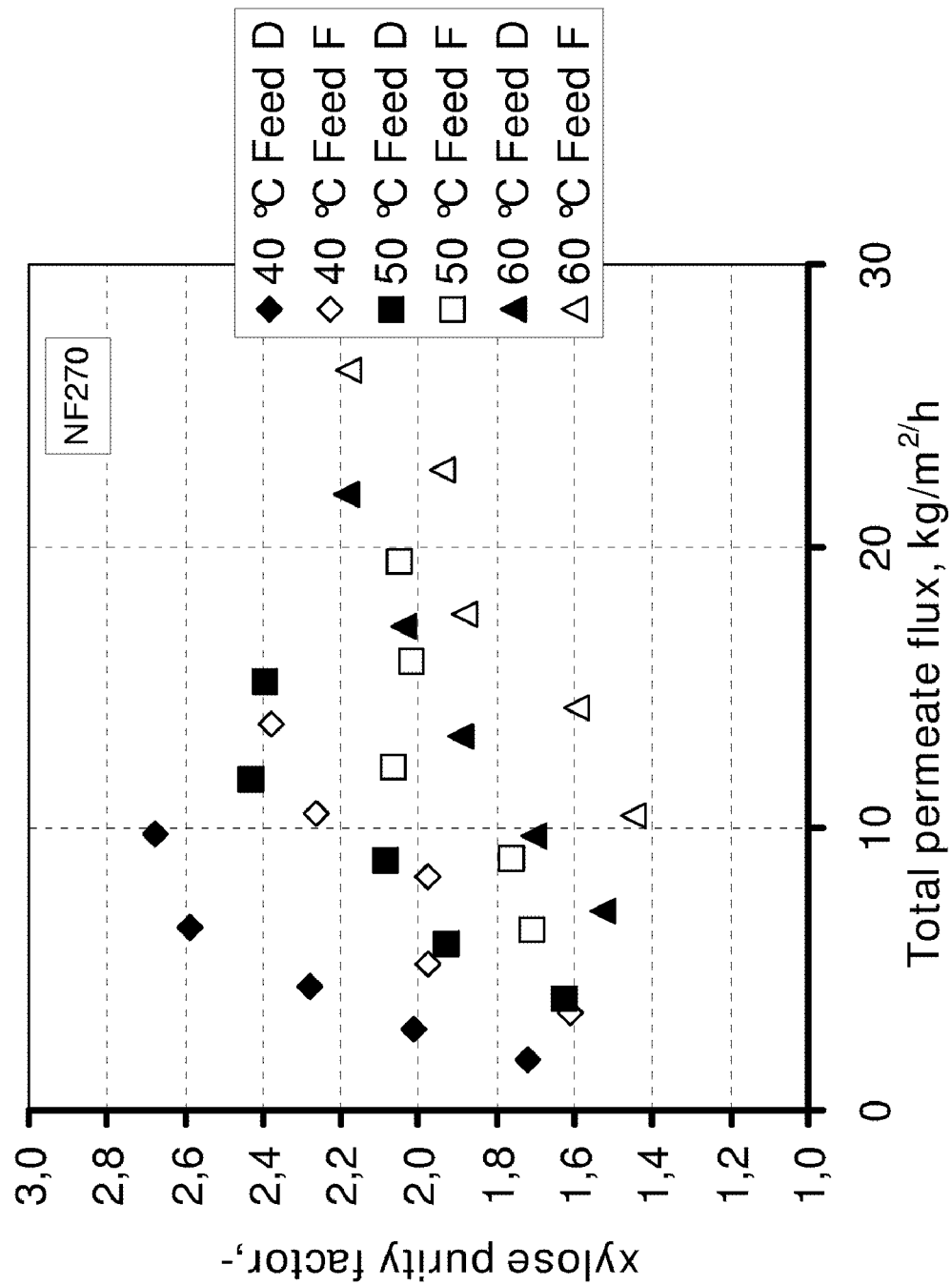
FIG. 3a shows the permeate dilution factor as a function of the xylose flux in the nanofiltration of Example 3.
FIG. 3c shows the xylose purity of the nanofiltration permeate as a function of the total permeate flux using NF270 nanofiltration membrane in the nanofiltration of Example 3.
FIG. 3d shows the xylose purity of the nanofiltration permeate as a function of the xylose flux using NF270 nanofiltration membrane in the nanofiltration of Example 3.
FIG. 3e shows the xylose flux as a function of the applied pressure using Desal-5 DL nanofiltration membrane in the nanofiltration of Example 3.
Figure 3:
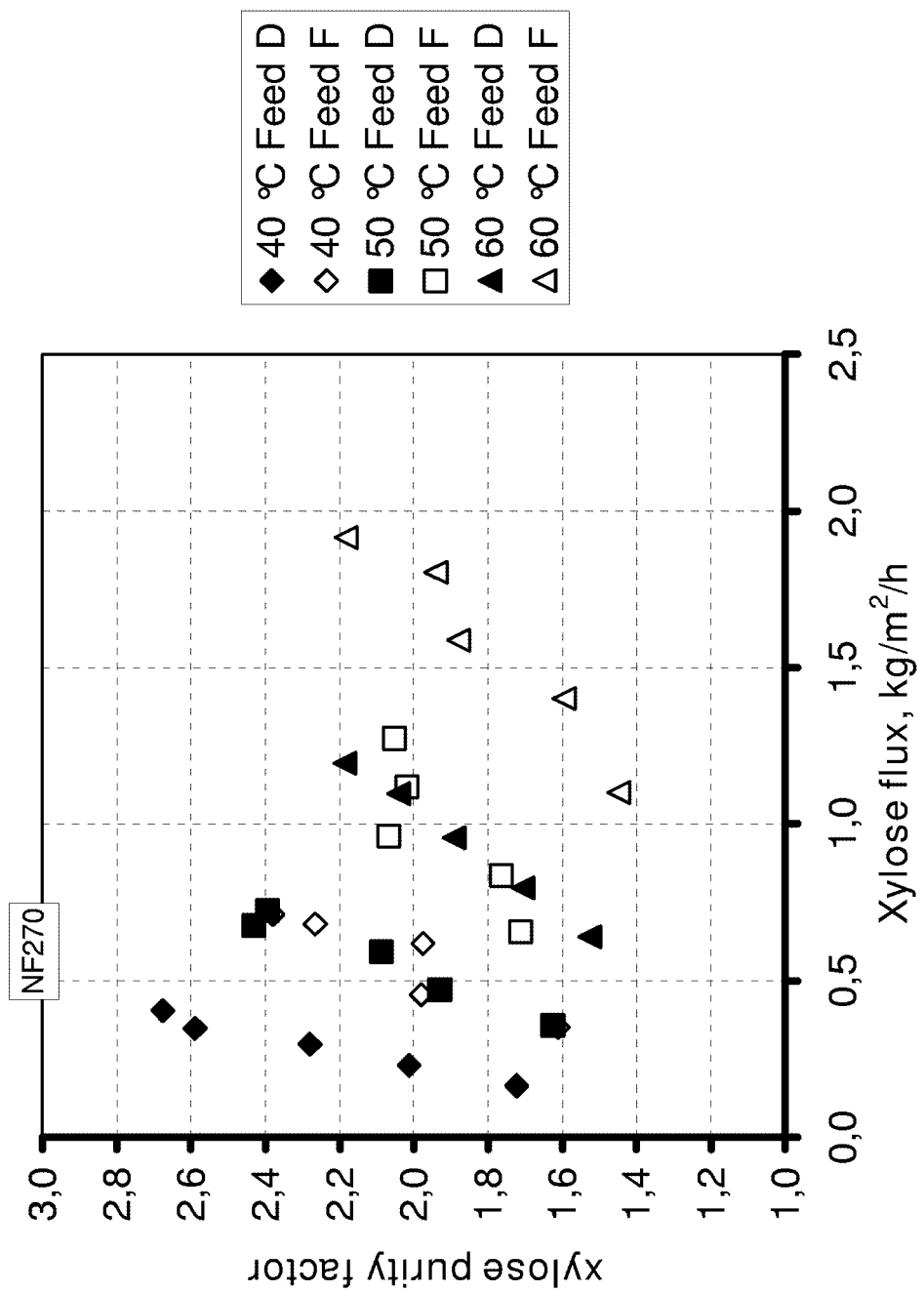

The invention relates to a process of recovering xylose by nanofiltration from a solution of plant-based biomass hydrolysate containing xylose, comprising subjecting the solution to nanofiltration by regulating the xylose flux to the range of 0.1-10, preferably 0.2-5 and most preferably 0.3-2 kg xylose $m^{-2}$ $h^{-1}$ to obtain a nanofiltration retentate and a nanofiltration permeate, and recovering the nanofiltration permeate comprising a solution enriched in xylose, expressed in % xylose on DS.

In the process of the present invention, the dry substance content of the solution of the plant-based biomass hydrolysate used as the nanofiltration feed is typically adjusted to the range of 5-60%, preferably 10-40% and more preferably 25-35% by weight. The content of the xylose in the nanofiltration feed is typically adjusted to the range of 10-65%, preferably 15-65% and most preferably 35-50% on DS (dry substance), corresponding to approximately 2-40 g xylose in 100 g of feed solution, preferably 5-20 g xylose in 100 g of feed solution. A typical favourable total permeate flux is in the range of 3-30 kg solution per $m^2$ in an hour.

The nanofiltration permeate obtained from the nanofiltration has a typical dry substance content in the range of 2-55%, preferably 5-40% and most preferably 10-30% by weight. The xylose content in the nanofiltration permeate is typically in the range of 25-99%, preferably 35-85% and most preferably 45-70% on DS.

The process typically provides a xylose enrichment factor of at least 1.2, typically in the range of 1.2-6 in the nanofiltration permeate and a permeate dilution factor higher than 0.2, preferably higher than 0.5. Separation of xylose from glucose is improved by the process of the invention and the xylose purity factor increases when the xylose flux is increasing.

The process of the invention provides a typical xylose yield of more than 20%, preferably more than 60%, more preferably more than 80% and most preferably more than 90% on xylose in the nanofiltration feed.

The nanofiltration in accordance with the present invention is carried out at a temperature range of 10-150° C., preferably 30-95° C. and most preferably 40-70° C. The nanofiltration pressure is in the range of 10-90 bar, preferably 20-70 bar and most preferably 30-45 bar. Temperature and pressure adjustments may be utilized in further embodiments of the invention to regulate the xylose flux and/or the xylose purity.

The pH in the nanofiltration process of the present invention is 1-10, preferably 2-8 and most preferably 3-6. Xylose stability is good in the pH range of 3-6. The pH may be adjusted to the desired range with compounds containing divalent cations, such $Mg^{2+}$ and $Ca^{2+}$, for example. When spent liquor is used as the nanofiltration feed, pH of the feed is preferably adjusted using the same reagent that has been used in the pulping stage, such as $Ca(OH)_2$ or MgO, for example.

In one embodiment of the invention, the xylose flux in the nanofiltration is regulated by adjusting the dry substance content of the nanofiltration feed to the range of 25-35% by weight. In a further embodiment of the invention, the xylose flux in the nanofiltration is regulated by adjusting the content of xylose in the nanofiltration feed to the range of 15-50% on DS. In a still further embodiment of the invention, the xylose flux in the nanofiltration is regulated by adjusting temperature to the range of 55-70° C. In a still further embodiment of the invention, the xylose flux in the nanofiltration is regulated by adjusting the nanofiltration pressure to the range of 30-40 bar. In a still further embodiment of the invention, the xylose flux in the nanofiltration is regulated by adjusting the pH to the range of 3-6. In an especially preferred embodiment of the invention, the xylose flux is regulated by adjusting two or more of the process parameters above to the desired range.

The nanofiltration membrane used in the present invention may be selected from polymeric and inorganic membranes having a cut-off size of 150-1000 g/mol, preferably 150 to 250 g/mol.

The nanofiltration membranes used in the present invention may be selected from polymeric and inorganic membranes.

Typical polymeric nanofiltration membranes useful in the present invention include, for example, polyether sulfone membranes, sulfonated polyether sulfone membranes, polyester membranes, polysulfone membranes, aromatic polyamide membranes, polyvinyl alcohol membranes and polypiperazine membranes and combinations thereof. Cellulose acetate membranes are also useful as nanofiltration membranes in the present invention. Typical inorganic membranes include $ZrO_2$- and $Al_2O_3$-membranes, for example.

Preferred nanofiltration membranes are selected from sulfonated polysulfone membranes and polypiperazine membranes. For example, specific useful membranes are Desal-5 DK and Desal-5 DL nanofiltration membranes (manufacturer Osmonics) for example.

The nanofiltration membranes which are useful in the present invention may have a negative or positive charge. The membranes may be ionic membranes, i.e. they may contain cationic or anionic groups, but even neutral membranes are useful. The nanofiltration membranes may be selected from hydrophobic and hydrophilic membranes.

The typical form of nanofiltration membranes is a flat sheet form. The membrane configuration may also be selected e.g. from tubes, spiral wound membranes and hollow fibers. "High shear" membranes, such as vibrating membranes and rotating membranes can also be used.

Before the nanofiltration procedure, the nanofiltration membranes may be pretreated by washing with a washing agent, typically with an acidic washing agent. Also alkaline washing agents or ethanol may be used.

The solution used as the nanofiltration feed in the present invention is a solution of plant-based biomass hydrolysate containing xylose and other monosaccharides. The other monosaccharides typically comprise one or more of glucose, arabinose, mannose, galactose and rhamnose. Furthermore, the hydrolysate may contain for example hydroxy acids, such as glucuronic acids and xylonic acids, and volatile acids, such as acetic acid.

The solution may be obtained from the hydrolysis of any plant-based biomass, typically xylan-containing vegetable material. In one preferred embodiment of the invention, the hydrolysate of xylan-containing vegetable material comprises a hydrolysate of lignocellulosic material, typically wood material. Wood material be derived from various wood species, particularly hardwood, such as birch, aspen and beech. Furthermore, the xylan-containing vegetable material in connection with the present invention may comprise various parts of grain (such as straw and husks, particularly corn and barley husks and corn cobs and corn fibers), bagasse, coconut shells, cottonseed skins etc.

The biomass hydrolysate used as the nanofiltration feed may be obtained from direct acid hydrolysis of biomass, from enzymatic or acid hydrolysis of a prehydrolysate obtained from biomass by prehydrolysis (with steam or acetic acid, for instance), and especially from sulphite pulping processes. The biomass hydrolysate used as starting material in the process of the invention may be also a part of a biomass hydrolysate obtained from hydrolysis of biomass-based material. Said part of a biomass hydrolysate may be a prepurified hydrolysate obtained e.g. by ultrafiltration or chromatography.

The biomass hydrolysate used for the recovery of xylose in accordance with the present invention may be a spent liquor obtained from a pulping process. A typical spent liquor useful in the present invention is a xylose-containing spent sulphite pulping liquor, which is preferably obtained from acid sulphite pulping. The spent liquor may be obtained directly from sulphite pulping. It may also be a concentrated sulphite pulping liquor or a side-relief obtained from sulphite cooking. It may also be a xylose-containing fraction chromatographically obtained from a sulphite pulping liquor or a permeate obtained by ultrafiltration of a sulphite pulping liquor. Furthermore, a post-hydrolyzed spent liquor obtained from neutral cooking is suitable. The spent liquor useful in the present invention is preferably obtained from hardwood pulping. A spent liquor obtained from softwood pulping is also suitable, preferably after the main part of hexoses have been removed e.g. by fermentation. In the present invention, the spent liquor to be treated may also be any other liquor obtained from the digestion or hydrolysis of plant-based biomass, typically cellulosic material with an acid. Such a hydrolysate can be obtained from cellulosic material for example by treatment with an inorganic acid, such as hydrochloric acid, sulphuric acid, sulphur dioxide or nitric acid, or by treatment with an organic acid, such as formic acid or acetic acid. A spent liquor obtained from a solvent-based pulping, such as ethanol-based pulping may also be used. Spent liquor from SA-cooking or a xylan-containing fraction thereof recovered by ultrafiltration is also useful for the invention. A biomass-based distillation residue may also be used. Such a distillation residue may be obtained for example from the distillation of ethanol.

In addition to xylose, the spent hardwood sulphite pulping liquor also contains other monosaccharides in a typical amount of 10 to 30%, based on the xylose content. Said other monosaccharides include e.g. glucose, galactose, rhamnose, arabinose and mannose. Xylose and arabinose are pentose sugars, whereas glucose, galactose, rhamnose and mannose are hexose sugars. Furthermore, the spent hardwood sulphite pulping liquor typically includes rests of pulping chemicals and reaction products of the pulping chemicals, lignosulphonates, oligosaccharides, disaccharides, xylonic acid, uronic acids, metal cations, such as calcium and magnesium cations, and sulphate and sulphite ions. The biomass hydrolysate used as starting material also contains rests of acids used for the hydrolysis of the biomass.

The xylose content of the spent liquor to be treated is typically 10 to 40% based on the dry substance content. A spent liquor obtained directly from hardwood sulphite pulping has a typical xylose content of 10 to 25%, based on the dry substance content.

The process may also comprise one or more pretreatment steps. The pretreatment before the nanofiltration is typically selected from ion exchange, membrane filtration, such as ultrafiltration, chromatography, concentration, pH adjustment, filtration, dilution and combinations thereof. Before the nanofiltration, the starting liquor may thus be preferably pretreated by ultrafiltration or chromatography, for example. Furthermore, a prefiltering step to remove the solid substances can be used before the nanofiltration. The pretreatment of the starting liquor may also comprise concentration, e.g. by evaporation, and neutralization. The pretreatment may also comprise crystallization, whereby the starting liquor may also be a mother liquor obtained from the crystallization of xylose, for example.

In a typical nanofiltration operation, the liquor to be treated, such as a spent liquor is fed through the nanofiltration equipment provided with nanofiltration membranes at the temperature and pressure conditions described above. The liquor is thus fractionated into a low molar mass fraction including xylose (permeate) and a high molar mass fraction including the non-desired components of the spent liquor (retentate).

The nanofiltration equipment useful in the present invention comprises at least one nanofiltration membrane element dividing the feed into a retentate and permeate section. The nanofiltration equipment typically also include means for controlling the pressure and flow, such as pumps and valves and flow and pressure meters and density meters. The equipment may also include several nanofiltration membrane elements in different combinations, arranged in parallel or series.

The flux of the permeate varies in accordance with the pressure. In general, at a normal operation range, the higher the pressure, the higher the flux. The flux also varies with the temperature. An increase of the operating temperature increases the flux. However, with higher temperatures and with higher pressures there is an increased tendency for a membrane rupture. For inorganic membranes, higher temperatures and pressures and higher pH ranges can be used than for polymeric membranes.

The nanofiltration in accordance with the present invention can be carried out batchwise or continuously, typically as a multi-stage process. In a multi-stage (multi-phase) nanofiltration process, the retentate from a preceding stage is typically introduced as the feed to the next stage.

The process of the present invention may also comprise one or more post-treatment steps. The post-treatment steps are typically selected from ion exchange, crystallization, chromatography, reverse osmosis, concentration by evaporation, colour removal, extraction and precipitation.

After nanofiltration, the xylose may be recovered from the permeate, e.g. by crystallization. The nanofiltered solution can be used as such for the crystallization, without further purification and separation steps. If desired, the nanofiltered xylose-containing liquor may be subjected to further purification, e.g. by chromatography, ion exchange, concentration e.g. by evaporation or reverse osmosis, or colour removal. The xylose may also be subjected to reduction, e.g. by catalytic hydrogenation, to obtain xylitol.

The process may also comprise recovering a solution rich in lignosulphonates, oligosaccharides, hexoses and divalent salts as the retentate. Said hexoses recovered in the retentate may comprise one or more of glucose, galactose, rhamnose and mannose.

In accordance with the present invention, the solution enriched in xylose and recovered as the permeate may also include other pentoses, such as arabinose.

The content of monosaccharide impurities in the xylose solution obtained from the nanofiltration process of the present invention is typically less than 50%, preferably less than 40%, more preferably less than 30%, most preferably less than 20% and especially less than 10% on DS. The monosaccharide impurities may comprise glucose, arabinose, mannose, galactose and rhamnose, for example. The content of glucose impurity is typically less than 30%, preferably less than 20% and more preferably less than 10% and most preferably less than 10% on DS.

In one embodiment of the invention, the invention relates to a process for recovering xylose from a solution of plant-based biomass hydrolysate by nanofiltration, where the nanofiltration is carried out under the following conditions:

dry substance content of the feed in the range of 15-30% by weight,
xylose content of the feed in the range of 12.5-50% on DS, and
xylose flux of the nanofiltration in the range of 0.2-6 kg xylose $m^{-2}$ $h^{-1}$, leading to
xylose enrichment factor in the range of 1.2-6 in the nanofiltration permeate, and
permeate dilution factor in the range of 0.3-0.8.

In this embodiment of the invention, the plant-based biomass hydrolysate used as the starting material is preferably spent sulphite pulping liquor. In a further embodiment of the invention, temperature adjustment is utilized to improve the xylose purity factor (xylose purity). In one embodiment of this aspect of the invention, the nanofiltration is operated at a temperature of 55 to 70° C. at the beginning of the nanofiltration, followed by temperature adjustment at a later stage of the nanofiltration. In a batch operation, the temperature is readjusted up to the end of the filtration process. In a continuous multi-phase process, for example a 3-phase process, the temperature will be readjusted in the second and third phases to be different from that of the first phase. If a higher xylose flux is desired, the readjustment may be done up to the temperature of 90° C. If a higher xylose purity is desired, the readjustment may be done down to 30° C. The selected temperature is dependent on the properties of the filtered solution.

The xylose solution obtained in accordance with the present invention may be used for the preparation of xylitol, for example. Xylitol is obtained by reducing the xylose product obtained, e.g. by catalytic hydrogenation. Xylose may be further purified by crystallization before reduction. The present invention also relates to the use of the xylose solution obtained by the process of the present invention for the preparation of xylitol, typically by reduction of xylose to xylitol.

Preferred embodiments of the invention will be described in greater detail by the following examples, which are not construed as limiting the scope of the invention.

In the examples and throughout the specification and claims, the following definitions have been used:

SMB refers to a simulated moving bed method.

DS refers to the dry substance content measured by Karl Fischer titration, expressed as % by weight.

RDS refers to the refractometric dry substance content, expressed as % by weight.

KF refers to the dry substance content measured by Karl Fischer titration, expressed as % by weight.

Flux refers to the amount (liters or kg) of the solution that permeates through the nanofiltration membrane during one hour calculated per one square meter of the membrane surface, $l/(m^2\ h)$ or $kg/(m^2\ h)$.

Xylose flux refers to the amount of xylose (kg) that permeates through the nanofiltration membrane during one hour calculated per one square meter of the membrane surface, $kg/(m^2\ h)$. Xylose flux may be determined by measuring the flow and the content of dry substance and xylose in the permeate.

HPLC (for the determination of carbohydrates) refers to liquid chromatography. The carbohydrates (monosaccharides) have been measured using HPLC and RI detection, disaccharides using HPLC and xylonic acid using HPLC and PED detection.

Colour (where determined) was measured by an adapted ICUMSA method at pH 5.

The following membranes were used in the examples:

Desal-5 DK (a four-layered membrane consisting of a polyester layer, a polysulfone layer and two proprietary layers, having a cut-off size of 150 to 300 g/mol, permeability (25° C.) of 5.4 $l/(m^2\ h\ bar)$ and $MgSO_4$-retention of 98% (2 g/l), manufacturer Osmonics), Desal-5 DL (a four-layered membrane consisting of a polyester layer, a polysulfone layer and two proprietary layers, having a cut-off size of 150 to 300 g/mol, permeability (25° C.) of 7.6 l/(m² h bar), MgSO$_4$-retention of 96% (2 µl), manufacturer Osmonics), and NF-270 (manufacturer Dow Filmtec, USA).

In the examples, observed retention, xylose purity factor, permeate dilution factor and xylose enrichment factor were calculated as follows:

Observed retention (R) is a measure of the membrane selectivity toward a solute as shown for xylose below:

$$R_{xyl} = 1 - \frac{c_p(xyl)}{c_f(xyl)}$$

$R_{xyl}$ observed retention of xylose
$c_p$(xyl) concentration of xylose in permeate (g/100 g of solution)
$c_f$(xyl) concentration of xylose in feed (g/100 g of solution).

The xylose purity factor ($X_{xyl}$) is a measure of the purification of xylose from glucose. This factor indicates the change in the permeate composition compared to the original ratio of xylose to glucose in the feed. The separation is achieved, if the purity factor is different from one (1). A value of more than one indicates xylose enrichment in the permeate compared to glucose.

$$X_{xyl} = \frac{(c_p(xyl)/c_p(glu))}{(c_f(xyl)/c_f(glu))} = \frac{1-R_{xyl}}{1-R_{glu}}$$

$c_p$(xyl) concentration of xylose in the permeate (g/100 g of solution)
$c_p$(glu) concentration of glucose in the permeate (g/100 g of solution)
$c_f$(xyl) concentration of xylose in the feed (g/100 g solution)
$c_f$(glu) concentration of glucose in the feed (g/100 g solution).

Permeate dilution factor is an indicator of the reduction of the dry substance content in the nanofiltration permeate in relation to the dry substance content of the feed. The permeate dilution factor L is calculated as follows:

$L$=[permeate $DS$]/[feed $DS$]

where "permeate DS" represents the dry substance content of the permeate, and "feed DS" represents the dry substance content of the feed. The dilution of the permeate becomes smaller as the dilution factor approaches 1.

Xylose enrichment factor is an indicator of the enrichment of xylose in the nanofiltration permeate. The xylose enrichment factor E is calculated as follows:

$E$=[xylose % on $DS$ in permeate]/[xylose % on $DS$ in feed]

where "xylose % on DS in permeate" represents the percentage content of xylose in the dry substance of the permeate (measured directly from the obtained permeate before any post-treatment) and "xylose % on DS in feed" represents the percentage content of xylose in the dry substance of the feed. The higher the factor E, the more xylose is enriched in the permeate.

In a multiphase nanofiltration process, the calculation of the xylose enrichment factor, xylose purity factor and permeate dilution factor may take place from a measurement over one membrane (which may be various membranes of the multi-phase nanofiltration membrane arrangement) or over the total multi-phase membrane arrangement.

In connection with the present invention, the nanofiltration retentate may also be referred to as the nanofiltration concentrate.

Furthermore, it is clear to one skilled in the art that the experimental results of different examples presented hereinafter are not directly comparable with each other due to the fouling of the membranes, the osmotic effects on the membranes, membrane types and the equipment design.

Example 1a

Nanofiltration was carried out for a 1195 kg batch of xylose-containing wood hydrolysate (a chromatographically separated xylose fraction of Mg-based acid spent sulphite pulping liquor), which had a dry substance content of 26.6%. The nanofiltration equipment used for the nanofiltration was a pilot-size membrane test unit equipped with Osmonics Desal 5 DK (5.6 m²) and Osmonics Desal 5 □L (5.6 m²) spiral wound membranes. The nanofiltration was carried out at a pressure of 33 bar (inlet pressure) and at a temperature of 60° C. During the nanofiltration, 1031 kg diafiltration water was added to the circulation tank of the nanofiltration equipment to improve the yield of xylose to the permeate. The collected permeate was divided into two batches of 1037 kg and 765 kg, respectively. In addition to the permeate batches, a batch of 424 kg of the concentrate (having a dry substance content of 22.4%) was withdrawn from the retentate side of the nanofiltration equipment.

Table 1a shows the dry substance content (%) and the xylose purity (% on DS) of the feed, concentrate and permeates of the nanofiltration. The overall xylose yield in the permeate was 93%.

TABLE 1a

Dry substance content and xylose purity of the nanofiltration

| | Batch size, kg | DS, % | Xylose, % on DS | Xylose yield, % |
|---|---|---|---|---|
| Feed solution | 1195 | 26.6 | 34.0 | |
| Concentrate out | 424 | 22.4 | 7.0 | |
| First permeate batch | 1037 | 12.5 | 61.8 | 74 |
| Second permeate batch | 765 | 6.7 | 39.7 | 19 |

The permeate flux was registered during the run and samples were simultaneously taken from the permeate for the xylose analysis.

FIG. 1a shows the xylose purities measured against the xylose flux for permeates obtained from the nanofiltration with membranes Desal 5 DK and Desal 5 DL. The curves demonstrate the importance of the xylose flux control on the permeate xylose purity. With this feed liquid, xylose flux should be controlled to be above 0.3 kg/m²/h to raise the permeate xylose purities to a value over 60% on DS.

Example 1b

Nanofiltration was carried out for a 840 kg batch of a xylose-containing wood hydrolysate derived from the same source as in Example 1a.

However, the feed was a more dilute solution having a dry substance content of 15.0% on DS. The nanofiltration equipment was the same as in Example 1a. The nanofiltration was carried out at a pressure of 35 bar (inlet pressure) and at a temperature of 60° C. During the nanofiltration, 100 kg diafiltration water was added to the circulation tank of the nanofiltration equipment to improve the yield of xylose to the permeate. The total amount of the collected permeate was 870 kg and the amount of the concentrate collected from the retentate side was 70 kg.

Table 1b shows the dry substance content (%) and the xylose purity (% on DS) of the feed, concentrate and permeate of the nanofiltration. The overall xylose yield in the permeate was 95%.

TABLE 1b

Dry substance content and xylose purity of the nanofiltration

|  | Batch size, kg | DS, % | Xylose, % on DS |
|---|---|---|---|
| Feed solution | 840 | 15.0 | 61.5 |
| Concentrate out | 70 | 26.9 | 24.0 |
| Permeate | 870 | 12.5 | 68.0 |

The permeate flux was registered during the run and samples were simultaneously taken from the permeate for the xylose analysis.

FIG. 1b shows the xylose purities measured against the xylose flux for permeates obtained from the nanofiltration with membranes Desal 5 DK and Desal 5 DL. The curves demonstrate the importance of the xylose flux control on the permeate xylose purity. With this feed liquid, xylose flux should be controlled to be above 0.3 kg/m$^2$/h to maintain the permeate xylose purities at a level of over 60% on DS. Furthermore, if xylose flux is controlled to be above 1 kg/m$^2$/h, xylose purities over 70% xylose on DS can be achieved.

Example 2

Nanofiltration of xylose-containing solutions from different stages of SMB separation of acid spent sulphite pulping liquor was studied (xylose solutions A, B and C). Average compositions of the feed solutions are shown in Table 2a. The main constituent of the rest (not shown) is lignosulphonates.

TABLE 2a

Composition of the feed solutions

|  | Composition, % on DS | | |
|---|---|---|---|
| Component | Solution A | Solution B | Solution C |
| Xylose | 12.3 | 20.5 | 42.5 |
| Glucose | 1.9 | 5.8 | 4.1 |
| Galactose + rhamnose | 1.2 | 5.0 | 3.7 |
| Arabinose + mannose | 1.3 | 6.8 | 5.0 |
| Xylonic acid | 4.3 | 13.6 | 6.9 |
| Xylobiose | 0.1 | 0.1 | 0.0 |
| Acetic acid | 1.8 | 1.1 | 1.6 |
| Salts | 5.2 | 6.9 | 4.5 |
| pH | 5.2 | 4.2 | 4.9 |

*salts are the sum of Na, K, Ca, Mg, SO$_3$ and SO$_4$

The experimental procedure is shown in Table 2b.

TABLE 2b

Experimental procedure

| Feed solution | °C. | pH | $p_{in}$, bar | Dry substance content of the feed, % |
|---|---|---|---|---|
| Solution A | 60 | 5.5 | 40 | 40→35→30→22→15→11 |
| Solution B | 60 | 5.5 | 40 | 40→35→30→22→15→11 |
| Solution C | 60 | 5.5 | 40 | 40→35→30→22→15→11 |

The nanofiltrations were done at constant temperature and pressure. For each dry substance of the feed, filtration was run in batch concentration mode for two hours. Samples were taken from the collected permeate. The size of the batch was 100 liters. The pH of the feed solution was adjusted to 5.5 with MgO.

The nanofiltration equipment was DSS Labstack M20 equipped with 10 Desal 5-DL membranes (Osmonics). Each membrane had a membrane area of 0.018 m$^2$.

The results of the nanofiltration experiments are presented in FIGS. 2a and 2b.

FIG. 2a shows the amount of xylose in the permeate (g xylose/100 g permeate solution, marked with black symbols) and the xylose flux (g/m$^2$/h, marked with open symbols connected with a line) as a function of the dry substance content (DS) of the feed for the three feed solutions A, B and C. It can be seen from the results of FIG. 2a that the xylose flux and xylose in permeate are highest for the feed solution C, which contains more xylose than the other two feeds. Furthermore, it can be seen that a xylose content of the permeate of about 23 g/100 g and a xylose flux of about 0.95 kg/m$^2$/h are achieved when the dry substance content (DS) of the feed is 32-42% and the xylose content of the feed is 42.5% on DS.

FIG. 2b shows the permeate dilution factor (marked with black symbols) and the xylose enrichment factor (marked with open symbols connected with a line) as a function of the dry substance content (DS) of the feed for the three feed solutions A, B and C. The results of FIG. 2b show that even with high dry substance concentration of the feed, the enrichment of xylose in the nanofiltration permeate will be essentially the same as with lower feed dry substance concentrations. Furthermore, it can be seen that a favourable dilution factor of over 0.5 is achieved with feed dry substance concentrations of 30-43% when the xylose content of feed is increased from a level of 10% to 20-43% on DS.

Example 3

Xylose flux and xylose purity in the nanofiltration permeate was studied with an industrial xylose-containing solution. The solution was a wood-derived xylose-containing fraction obtained from chromatographic SMB separation of an acid sulphite spent pulping liquor.

DDS Labstack M20 flat sheet module equipment was used in the nanofiltration. The module was equipped with following nanofiltration membranes: 10 pieces of Desal DL (0.180 m$^2$), 10 of Desal DK (0.180 m$^2$) and 10 of NF 270 (0.180 m$^2$). The feed tank was a 70-liter reactor provided with a stirrer and a steam/cooling water jacket.

For the nanofiltration, the xylose-containing solution was mixed with de-ionized water in the reactor to obtain a feed solution, which had a dry substance content of 20% and a xylose content of approximately 50% on DS (Feed D).

For comparison purposes, a comparison batch containing additional xylose was prepared by mixing the above-described wood-derived xylose-containing fraction, pure crystalline xylose (3 kg/70 liters solution) and ion-free water to obtain a xylose solution with the same dry substance content of 20% (Feed F). The xylose content of the comparison batch was approximately 60% on DS.

The feed samples prepared above had the following average composition:

|  | Feed D | Feed F |
|---|---|---|
| Dry substance content, % | 21.8 | 21.3 |
| Conductivity, mS/cm | 7.80 | 7.17 |
| pH | 5.53 | 5.56 |
| Glucose, g/100 g | 0.78 | 0.61 |
| Glucose, % on DS | 3.6 | 2.9 |

-continued

|  | Feed D | Feed F |
|---|---|---|
| Xylose, g/100 g | 10.62 | 12.56 |
| Xylose, % on DS | 48.7 | 59.1 |

Both solutions were nanofiltered in total reflux mode (where both the permeate and the retentate were circulated back to the feed tank). The retentate flow rate was approximately 6 l/min. Filtration pressures were 20, 25, 30, 35 and 40 bar and temperatures were 40, 50 and 60° C. The whole pressure range was tested at one temperature. Filtration at each pressure was done for approximately 30 minutes and then the pressure was raised. The flux was measured for each membrane after 15 and 30 minutes' filtration at each pressure. Samples of the feed, retentate and permeates were taken at each pressure after the first flux measurement.

Table 3 shows the relative increase in the xylose flux (%) when the xylose flux of the feed F (having a xylose content of approximately 60% on DS) is compared to the feed D (having a xylose content of approximately 50% on DS).

TABLE 3

|  | Desal DK | | | Desal DL | | | NF270 | | |
|---|---|---|---|---|---|---|---|---|---|
|  | 40° C. | 50° C. | 60° C. | 40° C. | 50° C. | 60° C. | 40° C. | 50° C. | 60° C. |
|  | Increase in xylose flux, % | | | Increase in xylose flux, % | | | Increase in xylose flux, % | | |
| 20 bar | 107 | 112 | 92 | 109 | 111 | 89 | 112 | 83 | 72 |
| 25 bar | 73 | 95 | 87 | 84 | 72 | 72 | 99 | 77 | 76 |
| 30 bar | 98 | 86 | 101 | 88 | 59 | 82 | 108 | 63 | 66 |
| 35 bar | 84 | 96 | 101 | 81 | 44 | 83 | 96 | 66 | 65 |
| 40 bar | 73 | 80 | 99 | 68 | 70 | 86 | 76 | 76 | 60 |

The results of Table 3 show that an increase of 10% in the xylose content of the feed solution increases the xylose flux by 60 to 112%. The achieved xylose purity in the permeate was 75-85% on DS.

FIG. 3a shows the permeate dilution factor as a function of the xylose flux (kg xylose/m$^2$/h) for feed solutions D and F at different temperatures and different pressures using Desal DK membrane as the nanofiltration membrane. Flux is increased by increasing the pressure. It can be seen from the results of FIG. 3a that the permeate dilution becomes smaller as the temperature increases. It can also be seen that a higher xylose content in the feed results in smaller dilution.

FIGS. 3b and 3c show the xylose purity factor as a function of the total permeate flux for feed solutions D and F at different temperatures using Desal-5 DL membrane and NF270 membrane as the nanofiltration membrane.

FIG. 3d shows the xylose purity factor as a function of the xylose flux for feed solutions D and F using NF270 membrane. It can be seen from FIGS. 3b, 3c and 3d that the xylose purity factor (which is an indicator of the separation of xylose from glucose) improves, when the total permeate flux or the xylose flux increases. When the temperature is lowered from 60° C. to 40° C., the separation of xylose from glucose improves, leading to improved xylose purity.

FIG. 3e shows the xylose flux for feed solutions D and F at different temperatures as a function of the applied pressure using Desal-5 DL membrane as the nanofiltration membrane. FIG. 3e shows that the xylose flux linearly increases, when the applied pressure is increased up to 35 bar, whereafter slight levelling of the xylose flux takes place. Increasing the temperature from 40° C. to 60° C. improves the xylose flux significantly for both feeds D and F.

Example 4

Separation of two monosaccharides from each other in concentrated monosaccharide solutions was carried out using different nanofiltration membranes with artificial feed solutions. The solutions were made of xylose and glucose in different ratios and in different total monosaccharide concentrations.

The nanofiltration equipment was DSS LabStak M20 (Alfa Laval Copenhagen A/S, Denmark) plate and frame equipment. The nanofiltration stack contained three different membranes: Desal DK, Desal DL (GE Osmonics, USA) and NF270 (Dow Filmtec, USA). Each membrane had a filtration area of 0.18 m$^2$. The feed tank was 70-liter reactor equipped with a mixing arm and a steam/water jacket. The liquid was pumped with a piston pump from the feed tank to the filtration equipment. A flow meter indicated the retentate flow back to the feed tank and the permeate flux was measured on scale.

The solutions containing xylose and glucose were prepared from pure crystalline substances. The dry solids content of the solutions was 2%, 10% and 30% on weight, respectively. At each dry solids content, three different solute compositions were made so that the mass ratio of xylose to glucose was 1:9, 1:1 and 9:1. The pH of the solution was adjusted to 3.5 with concentrated HCl. The selected pH corresponds to the pH of an industrial wood hydrolysate solution, where the separation of xylose from glucose would be desired.

Filtrations were done at 50° C. in total recycle mode, i.e. both permeate and retentate were circulated back to the feed tank. The filtration pressures were 10, 20, 30 and 40 bar. The solutions were filtered for 1 to 2 hours at each pressure. The cross-flow velocity along the membrane surface was 0.7-1.0 ms-1 depending on the membrane thickness. The permeate flux was measured twice for each membrane at the same pressure by weighing permeate collected during a time lapse of 1 to 5 minutes. Samples were taken once from the permeates, retentate and feed at each pressure stage.

Xylose and glucose contents were analyzed by HPLC method (Pb$^{2+}$ column, 85° C., 0.6 ml min$^{-1}$). In addition, pH and conductivity of the samples were measured.

Figure 4:
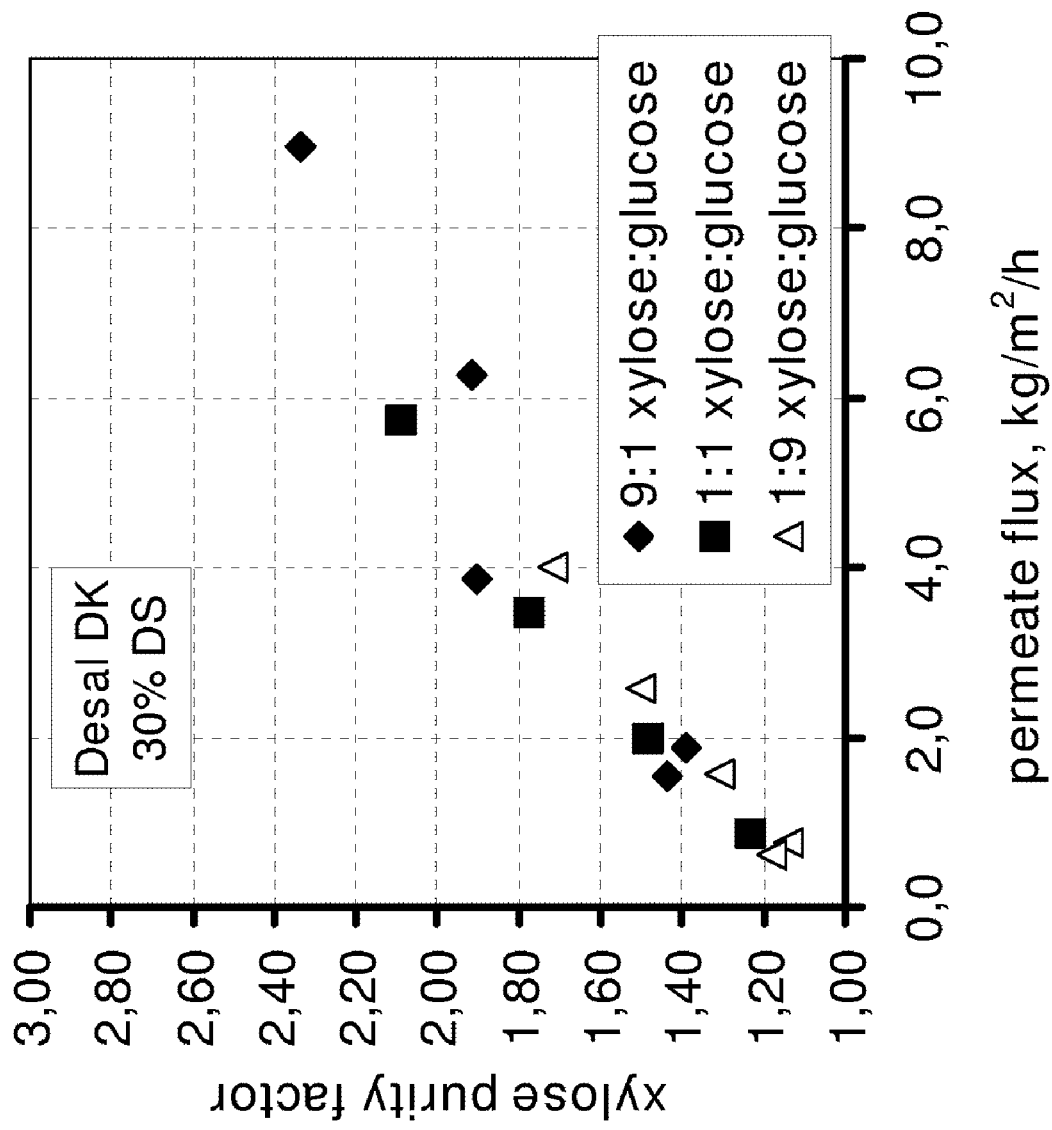
FIG. 4a shows the xylose purity factor over glucose as a function of the total permeate flux in the nanofiltration of Example 4.
FIG. 4b shows the xylose purity factor as a function of the xylose flux in the nanofiltration of Example 4.
FIG. 4c shows the xylose flux as a function of the applied nanofiltration pressure in the nanofiltration of Example 4.
FIG. 4d shows the difference between glucose and xylose retentions as a function of the total permeate flux in the nanofiltration of Example 4
FIG. 4e shows the difference between glucose and xylose retentions as a function of the xylose flux in the nanofiltration of Example 4.
Figure 4:
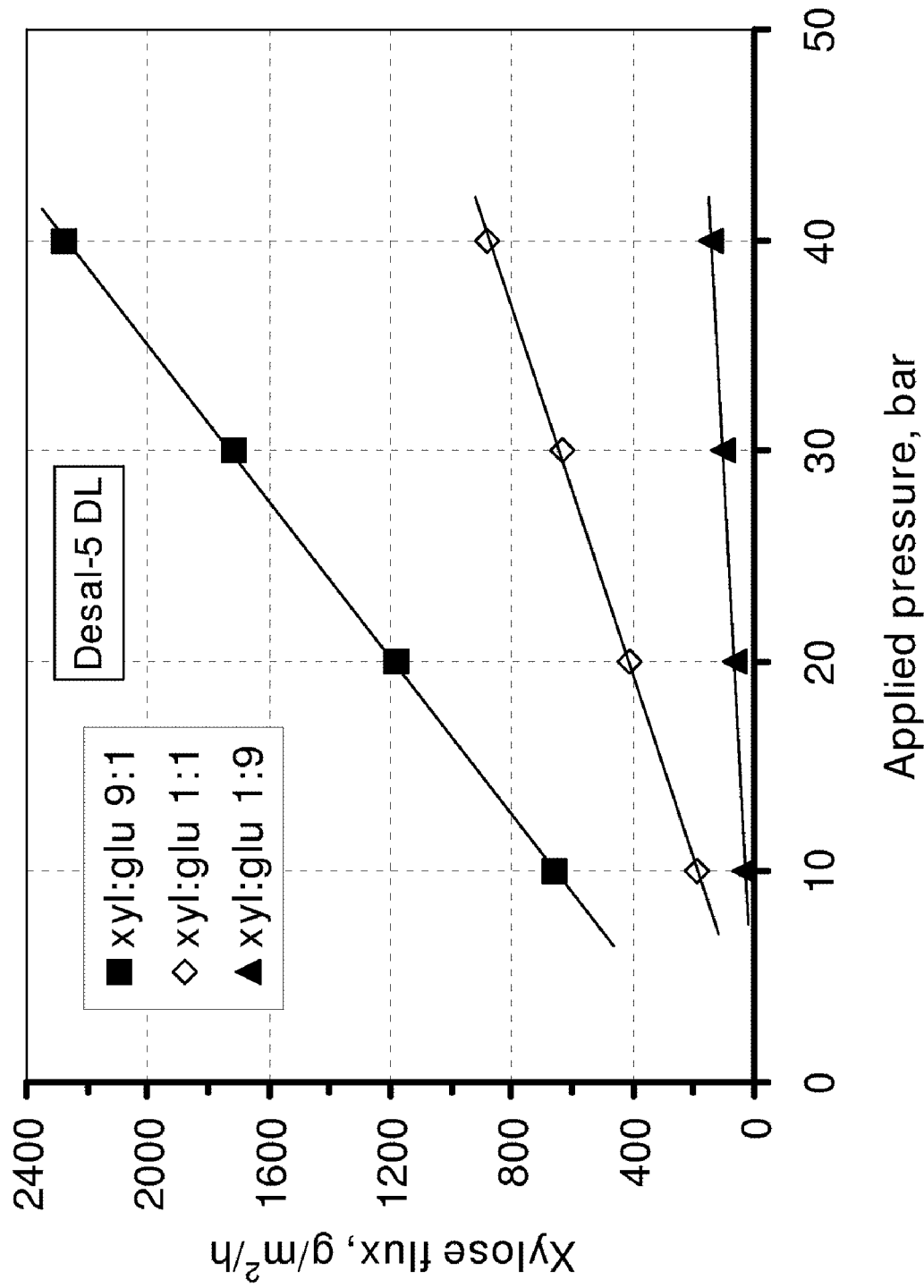

FIGS. 4a and 4b show the xylose purity factor as a function of total the permeate flux and as a function of the xylose flux for three different solution compositions (differing in the mass ratio of xylose to glucose) at 50° C. The permeate flux was increased by increasing the filtration pressure. It can be seen from the results of FIGS. 4a and 4b that the xylose purity factor over glucose is highly dependent on the total permeate flux and xylose flux. The higher the permeate/xylose flux, the higher xylose purification factors are obtained.

FIG. 4c shows the xylose flux of the xylose-glucose solution (g xylose/m$^2$/h) at 50° C. as a function of the filtration pressure for three different solution compositions (differing in the mass ratio of xylose to glucose). It can be seen that the total sugar flux increases as the proportion of xylose (having a smaller molar mass) in the solution increases.

FIG. 4d shows the difference between glucose and xylose retentions ($R_{glu}$-$R_{xyl}$) as a function of the total permeate flux using Desal-5 DK membrane as the nanofiltration membrane. It can be seen from FIG. 4d that the difference between the glucose and xylose retentions was at its largest between total fluxes from 5 to 20 kg/m$^2$/h.

FIG. 4e shows that the maximum difference between glucose and xylose retentions ($R_{glu}$-$R_{xyl}$) exists with Desal-5 DL membrane when shown as a function of the xylose flux.

Example 5

Xylose-containing wood hemicellulose hydrolysate (pH~3.0) was subjected to nanofiltration. A continuous nanofiltration run was carried out with a nanofiltration pilot unit including three nanofiltration stages in series. The pilot unit was equipped with Osmonics Desal 5 DL 4" spiral wound membranes. The nanofiltration was carried out at a temperature of 68° C. with constant flux by adjusting the feed pressure to control the flux level at a selected range. The nanofiltration was continued for 3 days while maintaining the flux, temperature, feed solution and flow rates stable. During the 3 days run, the feed pressure was gradually increased from 26 bar to 29 bar in order to control the permeate liquid flux at a selected 4.4 kg/m²/h flux level. The xylose flux was in an average 0.34 kg/m²/h.

| Composition of the nanofiltration feed solution, | g/100 g |
|---|---|
| Dry substance | 25.8 |
| pH (as is) | 2.8 |
| Xylose | 11.8 |
| Glucose | 1.3 |
| Other monosaccharides | 2.8 |
| Xylonic acid | 3.3 |
| Acetic acid | 1.2 |
| Mg | 1.1 |
| SO$_4$ | 2.0 |
| SO$_3$ | 0.1 |
| K | 0.1 |
| Others | 2.1 |

Nanofiltration was operated with 90.8% xylose yield to the permeate and the dry substance of the nanofiltration concentrate (=retentate) was adjusted to 25 g/100 g by feeding water to all three nanofiltration stages. In the equilibrium conditions, final concentrate and permeate samples from each three stages were taken. The result including HPLC analyses for the concentrate fraction, for the permeate fractions and for the combined permeate fraction are set forth in the table below. The permeate dilution factor, xylose enrichment factor and xylose purity factor are calculated separately over each stage and over the whole nanofiltration unit (1-3 stages).

TABLE 4

| | DS, % | Xy-lose, g/100 g | Xy-lose, % on DS | Glu-cose, g/100 g | Dilu-tion factor | Enrich-ment factor | Purity factor |
|---|---|---|---|---|---|---|---|
| Concentrate 1$^{st}$ stage | 26 | 9.9 | 37.9 | 1.4 | | | |
| Concentrate 2$^{nd}$ stage | 24.7 | 6.6 | 26.6 | 1.2 | | | |
| Concentrate 3$^{rd}$ stage | 23.8 | 4.8 | 16.6 | 1 | | | |
| Permeate 1$^{st}$ stage | 18.2 | 9.8 | 53.2 | 0.7 | 0.7 | 1.4 | 2 |
| Permeate 2$^{nd}$ stage | 15.0 | 7.2 | 48.0 | 0.9 | 0.6 | 1.8 | 1.45 |
| Permeate 3$^{rd}$ stage | 11.0 | 4.5 | 41.0 | 0.7 | 0.4 | 2.4 | 1.33 |
| Over 1-3 stages | | | | | 0.62 | 1.3 | 1.1 |

| Composition of the combined nanofiltration permeate | g/100 g |
|---|---|
| KF dry substance | 16.3 |
| pH (as is) | 2.5 |
| Xylose | 8.1 |
| Glucose | 0.82 |
| Other monosaccharides | 2.0 |
| Xylonic acid | 3.3 |
| Acetic acid | 1.7 |
| Mg | 0.29 |
| SO$_4$ | 0.33 |
| SO$_3$ | 0.16 |
| K | 0.10 |
| Others | 1.1 |

Combined nanofiltration permeate contained 55.4% xylose on non-volatile dry substance.

Example 6

Nanofiltration was carried out for a 10,200 kg batch of xylose-containing wood hydrolysate (a chromatographically separated xylose fraction of Mg-based acid spent sulphite pulping liquor), which had a dry substance content of 19.5% and pH 3.1. The nanofiltration equipment used for the nanofiltration was a pilot-size membrane test unit equipped with 6 pcs Osmonics Desal 5 DL spiral membranes, each spiral membrane having an area of 25.5 m² and thus a total area of 153 m² spiral wound membrane. The nanofiltration was carried out at a constant pressure of 29 bar (inlet pressure) and at a temperature of 68° C. During 15 hours nanofiltration run, the drop of flux caused by the increase of dry substance in the retentate was prevented by adding ion free water to the circulation tank with an automated system, which kept the dry substance content of the concentrate at a constant level of 23.5%. The amount of the produced xylose-rich permeate was 13,000 kg. The final amount of the retentate was 670 kg, having a dry substance content of 22.0%. The average liquid flux through the nanofiltration membrane during the batch run was 5.7 kg/m²/h. The average xylose flux through the nanofiltration membrane was 390 g/m²/h.

Table 1 shows the dry substance content (%) and the xylose purity (% on DS) of the feed, retentate and permeate of the nanofiltration. The xylose yield in the permeate was 97.1%.

TABLE 5

Dry substance content and xylose purity of the nanofiltration

| | Batch size, kg | DS, % | Xylose, % on DS | Enrich-ment factor | Dilu-tion factor |
|---|---|---|---|---|---|
| Feed solution | 10,200 | 19.5 | 48.9 | | |
| Retentate out | 670 | 22.0 | 16.7 | | |
| Permeate | 13,000 | 12.3 | 59.5 | 1.2 | 0.63 |

It will be obvious to a person skilled in the art that, as the technology advances, the inventive concept can be implemented in various ways. The invention and its embodiments are not limited to the examples described above but may vary within the scope of the claims.

The invention claimed is:

1. A process of recovering xylose by nanofiltration from a solution of plant-based biomass hydrolysate containing xylose, comprising
  subjecting the solution to nanofiltration to obtain a nanofiltration retentate and a nanofiltration permeate, and
  recovering the nanofiltration permeate comprising a solution enriched in xylose, further comprising regulating xylose flux in the nanofiltration permeate to a range of 0.2 to 3 kg xylose/(m$^2$/h), whereby the xylose flux refers to the amount of xylose (kg) that permeates through the nanofiltration membrane during one hour calculated per one square meter of the membrane surface and is determined by measuring the flow (solution flux) and the content of the dry substance and xylose in the permeate, by adjusting dry substance content (DS) of the solution of the plant-based biomass hydrolysate used as a nanofiltration feed to a range of 25-35% by weight and the xylose content of the nanofiltration feed to a range of 35-50% on DS, and by further adjusting the nanofiltration temperature to the range of 55-70° C. and the nanofiltration pressure to the range of 30-40 bar, and recovering a nanofiltration permeate having a dry substance content of 5 to 40% by weight and a xylose content of 35 to 85% on DS, to provide a xylose enrichment factor of at least 1.2 in the nanofiltration permeate, a permeate dilution factor higher than 0.2 and a xylose yield of more than 60% on xylose in the nanofiltration feed.

2. A process as claimed in claim 1, wherein the process provides a dry substance content in the range of 10 to 30% by weight in the nanofiltration permeate.

3. A process as claimed in claim 1, wherein the process provides a xylose content in the range of 45-70% on DS in the nanofiltration permeate.

4. A process as claimed in claim 1, wherein the process provides a xylose enrichment factor in the range of 1.2 to 6 in the nanofiltration permeate.

5. A process as claimed in claim 1, wherein the process provides a permeate dilution factor higher than 0.5.

6. A process as claimed in claim 1, wherein the nanofiltration is operated at a temperature of 55 to 70° C. at the start of the nanofiltration, followed by readjusting the temperature at a later stage of the nanofiltration.

7. A process as claimed in claim 6, wherein the nanofiltration is carried out as a multi-phase nanofiltration and the temperature is readjusted in later phases to be different from that of the first phase.

8. A process as claimed in claim 6, wherein the temperature at the later stage of the nanofiltration is readjusted to be lower than 90° C.

9. A process as claimed in claim 6, wherein the temperature at the later stage of the nanofiltration is readjusted to be lower than 30° C.

10. A process as claimed in claim 1, wherein the nanofiltration is carried out at a pH in range of 1-10.

11. A process as claimed in claim 10, wherein the pH is adjusted with compounds containing divalent cations.

12. A process as claimed in claim 11, wherein said divalent cations is $Mg^{2+}$ or $Ca^{2+}$.

13. A process as claimed in claim 1, wherein the xylose flux is regulated by adjusting the pH to the range of pH 3 to pH 6.

14. A process as claimed in claim 1, wherein the nanofiltration is carried out with a nanofiltration membrane having a cut-off size in the range of 150-1000 g/mol.

15. A process as claimed in claim 1, wherein the nanofiltration is carried out with a nanofiltration membrane selected from polymeric and inorganic membranes.

16. A process as claimed in claim 1, wherein the hydrolysate of plant-based biomass comprises a hydrolysate of xylan-containing vegetable material.

17. A process as claimed in claim 16, wherein the hydrolysate of xylan-containing vegetable material comprises a hydrolysate of lignocellulosic material.

18. A process as claimed in claim 17, wherein the hydrolysate of lignocellulosic material comprises a hydrolysate of wood material.

19. A process as claimed in claim 18, wherein the hydrolysate of wood material comprises a spent liquor obtained from a pulping process.

20. A process as claimed in claim 19, wherein the spent liquor obtained from a pulping process is a spent sulphite pulping liquor.

21. A process as claimed in claim 20, wherein the spent sulphite pulping liquor is an acid spent sulphite pulping liquor.

22. A process as claimed in claim 21, wherein the spent sulphite pulping liquor is obtained from hardwood sulphite pulping.

23. A process as claimed in claim 1, wherein the solution of plant-based biomass hydrolysate is a biomass-based distillation residue.

24. A process as claimed in claim 23, wherein the distillation residue is obtained from the distillation of ethanol.

25. A process as claimed in claim 1, wherein the solution of plant-based biomass hydrolysate contains further monosaccharides in addition to xylose.

26. A process as claimed in claim 25, wherein the monosaccharides comprise one or more of glucose, arabinose, mannose, galactose and rhamnose.

27. A process as claimed in claim 1, comprising recovering as the nanofiltration permeate a xylose solution having a content of monosaccharide impurities of less than 50 on DS.

28. A process as claimed in claim 27, wherein the monosaccharides comprise one or more of glucose, arabinose, mannose, galactose and rhamnose.

29. A process as claimed in claim 28, wherein the content of glucose impurity is less than 30% on DS.

30. A process as claimed in claim 28, wherein the content of glucose impurity is less than 10% on DS.

31. A process as claimed in claim 1, wherein biomass solution has been subjected to one or more pre-treatment steps.

32. A process as claimed in claim 31, wherein the pre-treatment steps are selected from ion exchange, membrane filtration, chromatography, concentration, pH adjustment, filtration, dilution, crystallization and combinations thereof.

33. A process as claimed in claim 1, wherein the process also comprises one or more post-treatment steps.

34. A process as claimed in claim 1, wherein the post-treatment steps are selected from ion exchange, cystalization, chromatography, reverse osmosis, concentration by evaporation, colour removal, extraction and precipitation.

35. A process as claimed in claim 1, wherein the nanofiltration is carried out as a batch process or a continuous process.

36. A process as claimed in claim 1, wherein the process further comprises recovering a solution enriched in lignosulphonates as the nanofiltration retentate.

37. A process as claimed in claim 1, wherein the process provides a xylose yield of more than 80% on xylose in the nanofiltration feed.

38. A process as claimed in claim 1, wherein the process provides a xylose yield of more than 90% on xylose in the nanofiltration feed.

39. A process as claimed in claim 1, wherein the process is carried out with a total permeate flux of 3-30 kg/m$^2$/h.

40. A process as claimed in claim 1, wherein the xylose content of the nanofiltration feed is 5-20 g xylose in 100 g of feed solution.

* * * * *